(12) United States Patent
Iizuka

(10) Patent No.: US 7,848,576 B2
(45) Date of Patent: Dec. 7, 2010

(54) IMAGE MATCHING METHOD, IMAGE MATCHING APPARATUS, AND PROGRAM

(75) Inventor: Ken Iizuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1011 days.

(21) Appl. No.: 10/567,182

(22) PCT Filed: Jun. 15, 2005

(86) PCT No.: PCT/JP2005/010926

§ 371 (c)(1),
(2), (4) Date: Feb. 3, 2006

(87) PCT Pub. No.: WO2005/124688

PCT Pub. Date: Dec. 29, 2005

(65) Prior Publication Data

US 2008/0232713 A1    Sep. 25, 2008

(30) Foreign Application Priority Data

Jun. 18, 2004   (JP)   ............................. 2004-180832

(51) Int. Cl.
*G06K 9/62* (2006.01)
(52) U.S. Cl. .................. 382/209; 382/115; 382/181
(58) Field of Classification Search ............... 382/209, 382/281, 276, 224, 115, 181, 284
See application file for complete search history.

(56) References Cited

U.S. PATENT DOCUMENTS 5,412,738 A * 5/1995 Brunelli et al. ............. 382/115

(Continued)

FOREIGN PATENT DOCUMENTS

JP    10-021391    1/1998

(Continued)

OTHER PUBLICATIONS

Japanese Office Action issued on Oct. 6, 2009, for corresponding Japanese Patent Application JP 2008-131378.

(Continued)

*Primary Examiner*—Daniel G Mariam
*Assistant Examiner*—Aklilu K Woldemariam
(74) *Attorney, Agent, or Firm*—K&L Gates LLP

(57) ABSTRACT

To provide an image matching method, an image matching apparatus, and a program able to perform a matching images at a high accuracy. A Hough transform unit 15 performs a Hough transform processing to a registered image AIM and an image to be matched RIM, in detail, an image processing by which points in each image are transformed to a curved pattern and linear components in each image are transformed to a plurality of the overlapped curved-patterns, based on a distance ρ from a reference position to a shortest point in a straight line L passing through a point in the image and an angle θ between a straight line n0 passing though the reference position and the shortest point and a x-axis as a reference axis including the reference position, and generating a transformed image S1621 and a transformed image S1622. A judgment unit 164 performs a matching of the registered image AIM and the image to be matched RIM based on a degree of an overlap of the patterns in the transformed image S1621 and the transformed image S1622 and a matching or mismatching of the patterns in the same.

30 Claims, 22 Drawing Sheets

U.S. PATENT DOCUMENTS

| | | | | |
|---|---|---|---|---|
| 6,097,839 | A | * | 8/2000 | Liu .............................. 382/181 |
| 6,259,809 | B1 | * | 7/2001 | Maruo ......................... 382/151 |
| 6,381,376 | B1 | * | 4/2002 | Toyoda ....................... 382/284 |
| 6,714,680 | B1 | * | 3/2004 | Sasada ........................ 382/216 |
| 6,751,363 | B1 | * | 6/2004 | Natsev et al. ................ 382/305 |
| 7,127,106 | B1 | * | 10/2006 | Neil et al. ................... 382/181 |
| 7,221,810 | B2 | * | 5/2007 | Andreasson et al. ......... 382/284 |
| 2003/0169928 | A1 | * | 9/2003 | Stanek ........................ 382/232 |
| 2004/0218815 | A1 | * | 11/2004 | Iizuka ......................... 382/209 |

FOREIGN PATENT DOCUMENTS

| | | |
|---|---|---|
| JP | 10-162139 | 6/1998 |
| JP | 11-003421 | 1/1999 |
| JP | 11-328408 | 11/1999 |
| JP | 2001-118065 | 4/2001 |

OTHER PUBLICATIONS

European Office Action issued on Jun. 23, 2009, for corresponding European Patent Application EU 05751549.

Onishi et al., "Detection of Rotation and Parallel Translation Using Hough and Fourier Transforms," Proceedings of the International Conference on Image Processing (ICP) Lausanne, Sep. 16-19, 1996; [Proceedings of the International Conference on Image Processing (ICP)], Sep. 16, 1996, pp. 827-830, vol. 3, New York, IEEE, US.

Ratha et al., "A Real-Time Matching System for Large Fingerprint Databases," IEEE Transations on Pattern Analysis and Machine Intelligence, IEE Service Center, Aug. 1, 1996, pp. 799-812, vol. 18, No. 8, Los Alamitos, CA, US.

Japanese Office Action issued on Jun. 30, 2009, for corresponding Japanese Patent Application 2008-131378.

* cited by examiner

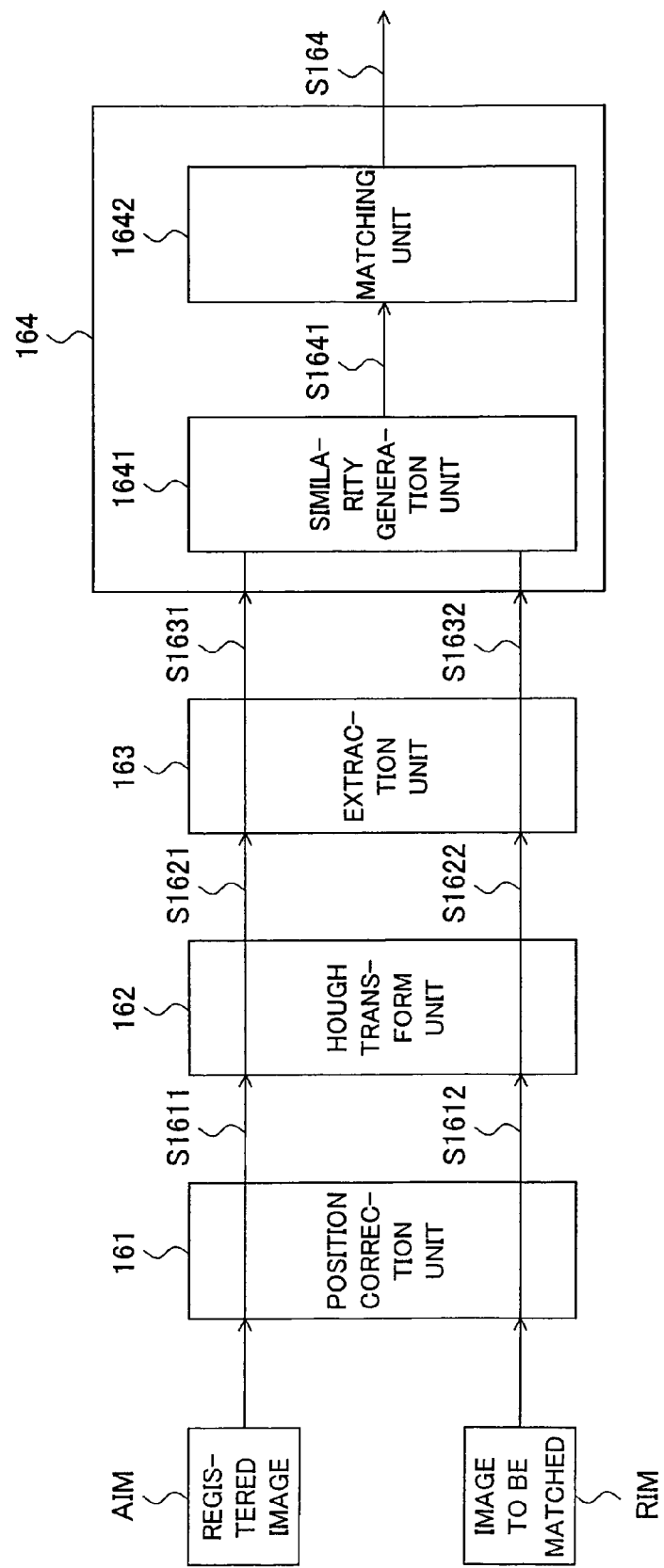

(SELF CORRELATION)

(PHASE-ONLY CORRELATION)

IMAGE MATCHING METHOD, IMAGE MATCHING APPARATUS, AND PROGRAM

CROSS REFERENCE TO RELATED APPLICATIONS

The present application claims priority to Japanese Patent Document No. P2004-180832 filed on Jun. 18, 2004, the disclosure of which is herein incorporated by reference.

The present invention relates to an image matching method and an image matching apparatus for matching two images such as blood vessel images, fingerprint images, still images or moving images, based on linear components within the images, and a program for the same.

Conventionally, there is known various image matching apparatuses as an apparatus for performing a matching images to an image information. For example, there is known an image matching apparatus in which a registered image and an image to be matched are compared based on a predetermined positional relationship, correlation values thereof are calculated, and the matching of the registered image and the image to be matched are carried out based on the correlation values. Otherwise, in the case where the correlation values are generated, there is also known an image matching apparatus in which the correlation values are generated by an operation in every pixel unit.

However, in the above image matching apparatus, if, there are pattern-grades such as many linear components in the images even if a correlation of the two images is small, and then there are many crossed points of the linear components in the registered image and the image to be matched, the crossed points greatly contribute to the correlation value to increase the correlation values, and, as a result, a sufficient matching accuracy may not be obtain. So there is demanded to improve the apparatus.

The present invention was made in consideration of the above discussions, and, an object of the present invention is to provide an image matching method, an image matching apparatus, and a program for achieving an image matching at a high accuracy.

To achieve the above object, according to a first aspect of the present invention, there is provided an image matching method for performing a matching images to linear components in a first image and a second image, the method having: a first step of performing an image processing for transforming points in each image of the first image and the second image to a curved pattern and transforming the linear component in the image to a plurality of overlapped curved-patterns, based on a distance from a reference position to a shortest point in a straight line passing through a point in the image and an angle between a straight line passing though the reference position and the shortest point and a reference axis including the reference position, and generating a first transformed image and a second transformed image, and a second step of performing a matching of the first image and the second image based on a degree of an overlap of the patterns in the first transformed image and the second transformed image generated in the first step and a matching or mismatching of the patterns in the first and second transformed images.

Further, to achieve the above object, according to a second aspect of the present invention, there is provided an image matching method for performing a matching images to linear components in a first image and a second image, the method having: a first step of performing a Hough transform processing to the first image and the second image to generate a first transform image and a second transform image, and a second step of performing a matching of the first image and the second image based on a degree of an overlap of patterns in the first transformed image and the second transformed image generated in the first step and a matching or mismatching of the patterns in the first and second transformed images.

Further, to achieve the above object, according to a third aspect of the present invention, there is provided an image matching apparatus performing a matching images to linear components in a first image and a second image, the apparatus having: a transform means for performing an image processing to the first image and the second image, by which points in each image are transformed to a curved pattern and the linear components in each image are transformed to a plurality of overlapped curved-patterns based on a distance from a reference position to a shortest point in a straight line passing through a point in the image and an angle between a straight line passing though the reference position and the shortest point and a reference axis including the reference position, and generating a first transformed image and a second transformed image, and a matching means for performing a matching of the first image and the second image based on a degree of an overlap of the patterns in the first transformed image and the second transformed image generated by the transform means and a matching or mismatching of the patterns in the first and second transformed images.

Further, to achieve the above object, according to a fourth aspect of the present invention, there is provided an image matching apparatus performing a matching images to linear components in a first image and a second image, the apparatus having: a transform means for performing a Hough transform processing to the first image and the second image to generate a first transformed image and a second transformed image, and a matching means for performing a matching of the first image and the second image based on a degree of an overlap of patterns in the first transformed image and the second transformed image generated by the transform means and a matching or mismatching of the patterns in the first and second transformed images.

Further, to achieve the above object, according to a fifth aspect of the present invention, there is provided a program that causes an information processing device to perform a matching images to linear components in a first image and a second image, the program having: a first routine for performing an image processing to the first image and the second image, by which points in each image are transformed to a curved pattern and linear components in each image are transformed to a plurality of overlapped curved-patterns based on a distance from a reference position to a shortest point through a point in the image toward a straight line and an angle between a straight line passing though the reference position and the shortest point and a reference axis including the reference position, and generating a first transformed image and a second transformed image, and a second routine for performing a matching of the first image and the second image based on a degree of an overlap of the patterns in the first transformed image and the second transformed image generated in the first routine and a matching or mismatching of the patterns in the same.

Further, to achieve the above object, according to a sixth aspect of the present invention, there is provided a program that causes an information processing device to perform a matching images to linear components in a first image and a second image, the program having: a first routine for performing a Hough transform processing to the first image and the second image to generate a first transformed image and a second transformed image, and a second routine for performing a matching of the first image and the second image based on a degree of an overlap of patterns in the first transformed image and the second transformed image generated in the first routine and a matching or mismatching of the patterns in the first and second transformed images.

According to the present invention, in the first step and in the first routine, a step transform means performs an image processing for transforming points in each image of the first image and the second image to a curved pattern and transforming linear components in each image to a plurality of overlapped curved-patterns, based on a distance from a reference position to a shortest point in a straight line passing through a position in the image and an angle between a straight line through the reference position and the shortest position and a reference axis including the reference position, and generating the first transformed image and the second transformed image.

SUMMARY

In the second step and in the second routine, the matching means matches the first image and the second image, based on the degree of the overlap of the patterns in the first transformed image and the second transformed image generated by the transform means and a matching or mismatching of the patterns in the first and second transformed images.

According of the present invention, there is provided an image matching method, an image matching apparatus, and a program, enabling the image matching at a high accuracy.

Additional features and advantages of the present invention are described in, and will be apparent from, the following Detailed Description and the Figures.

BRIEF DESCRIPTION OF THE BRIEF DESCRIPTION OF THE FIGURES

FIG. 2 is a functional block diagram illustrated in a form of software of the image matching apparatus shown in FIG. 1.

Figure 17:
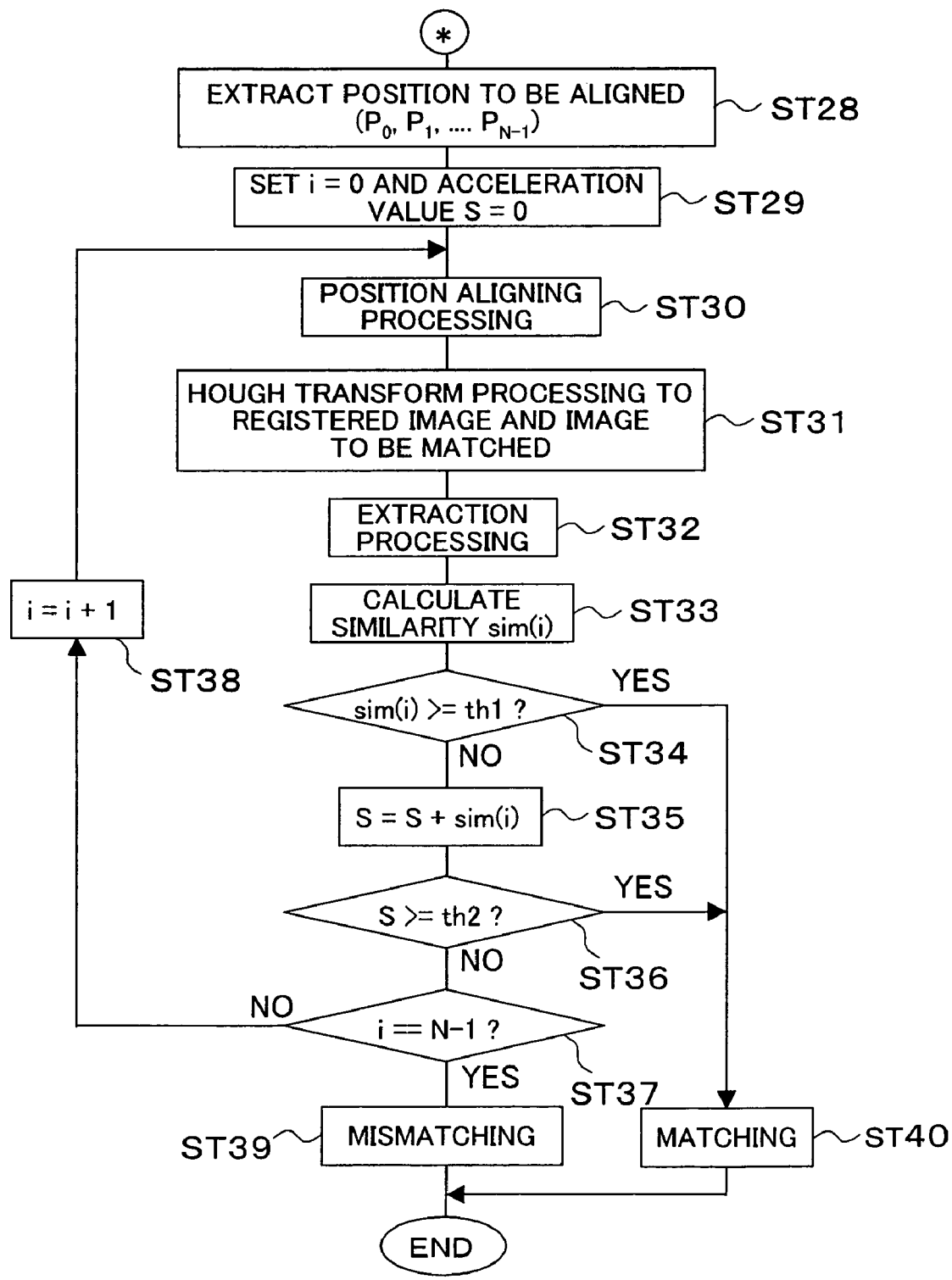
FIG. 17 is a flow chart for explaining an operation of the image matching apparatus of the third embodiment according to the present invention.
Figure 19C:
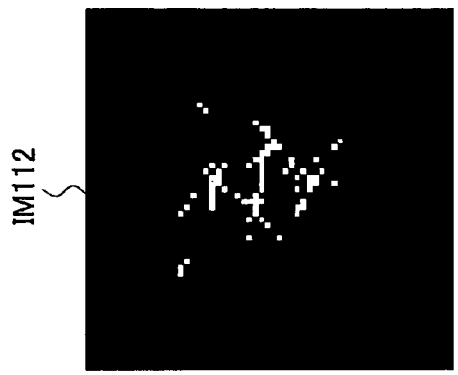
Figure 19F:
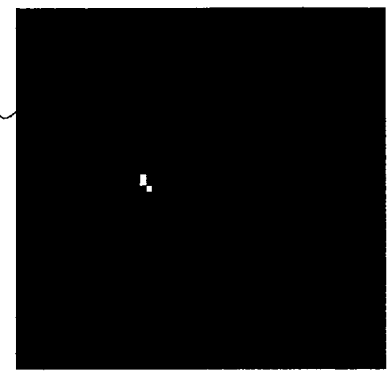
Figure 19B:
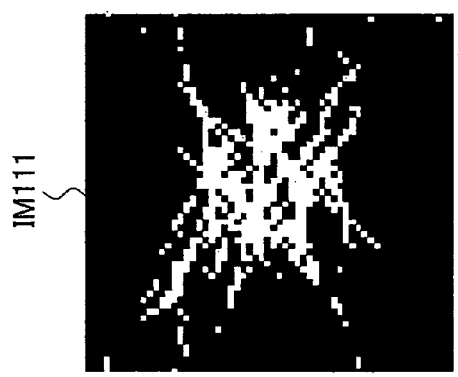
Figure 19E:
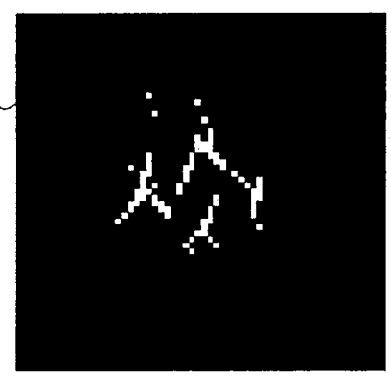
Figure 19A:
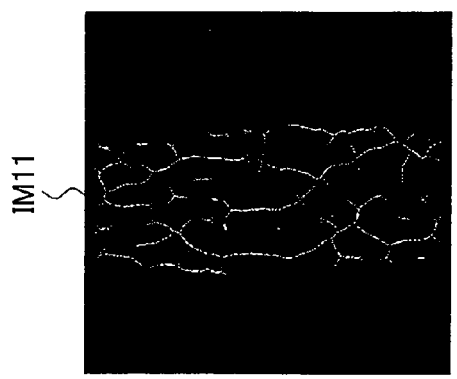
Figure 19D:
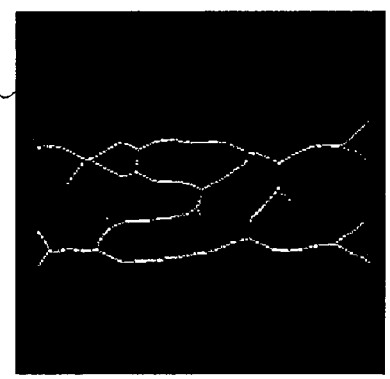

FIGS. 19A to 19F are views for explaining an operation of the image matching apparatus 1c shown in FIG. 17; FIG. 19A is a view showing a specific example of an image IM11; FIG. 19B is a view showing an image in which a region equal to or greater than a first threshold is extracted from the image IM11 shown in FIG. 19A; FIG. 19C is a view showing an image in which a region equal to or greater than a second threshold larger than the first threshold is extracted from the image IM11 shown in FIG. 19A; FIG. 19D is a view showing a specific example of an image IM12; FIG. 19E is a view showing an image in which a region equal to or greater than a first threshold is extracted from the image IM12 shown in FIG. 19D; and FIG. 19F is a view showing an image in which a region equal to or greater than a second threshold, larger than the first threshold, is extracted from the image IM11 shown in FIG. 19D.

Figure 20:
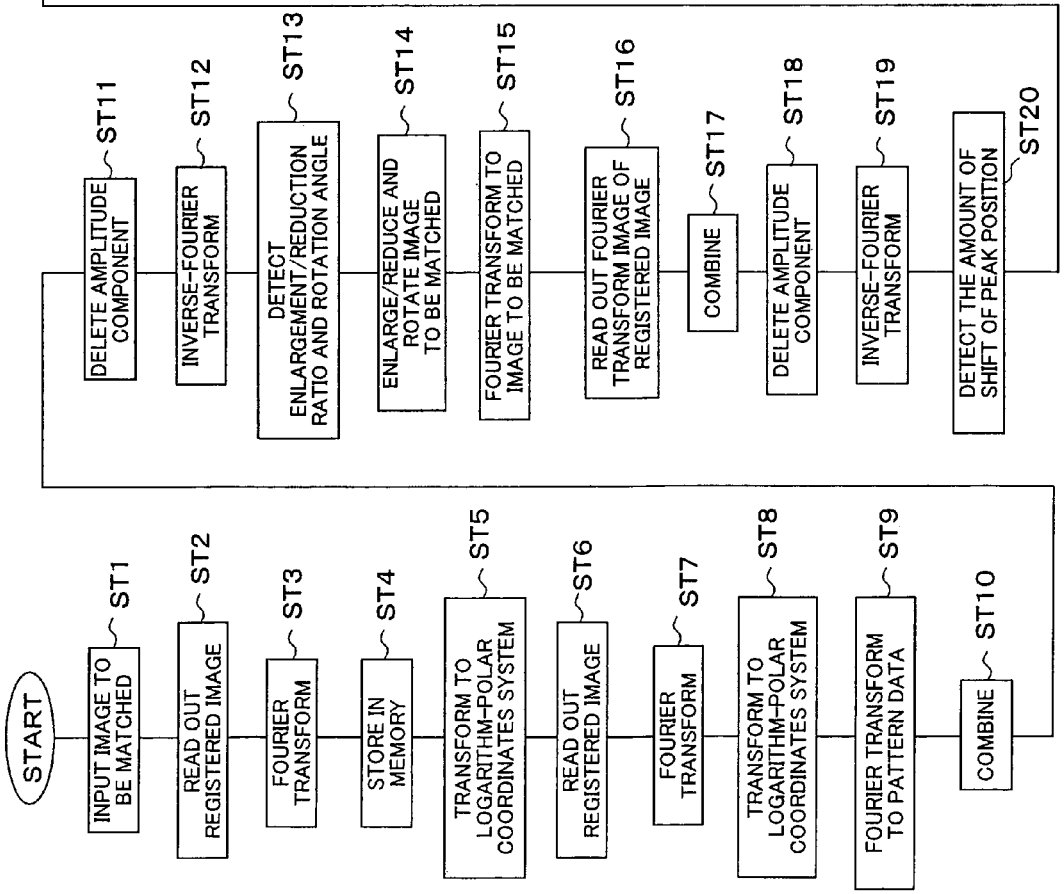

FIG. 20 is a flow chart for explaining an operation of the image matching apparatus according to the present embodiment.

Figure 21:
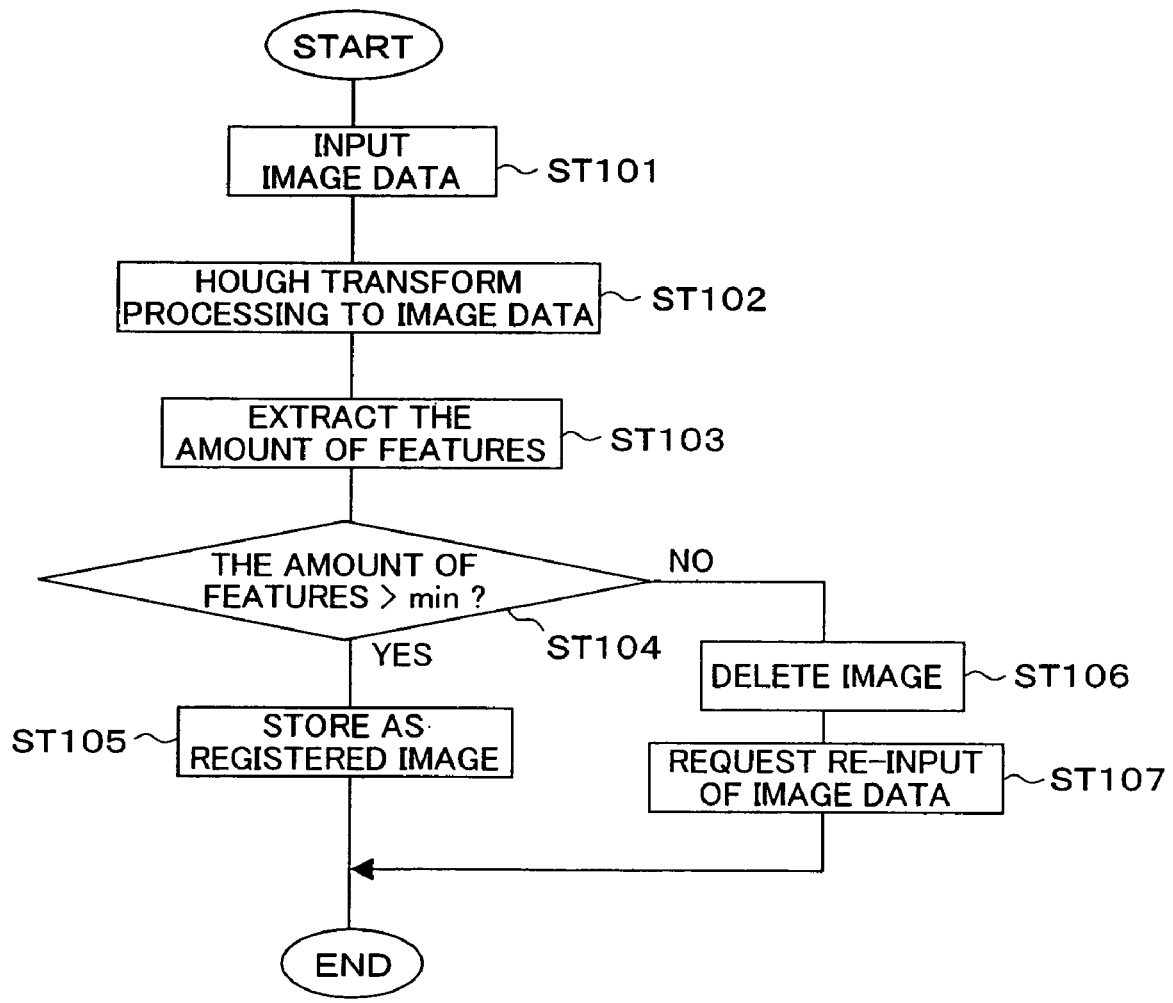

FIG. 21 is a flow chart for explaining an operation of an image matching apparatus of a fifth embodiment according to the present invention.

Figure 22:
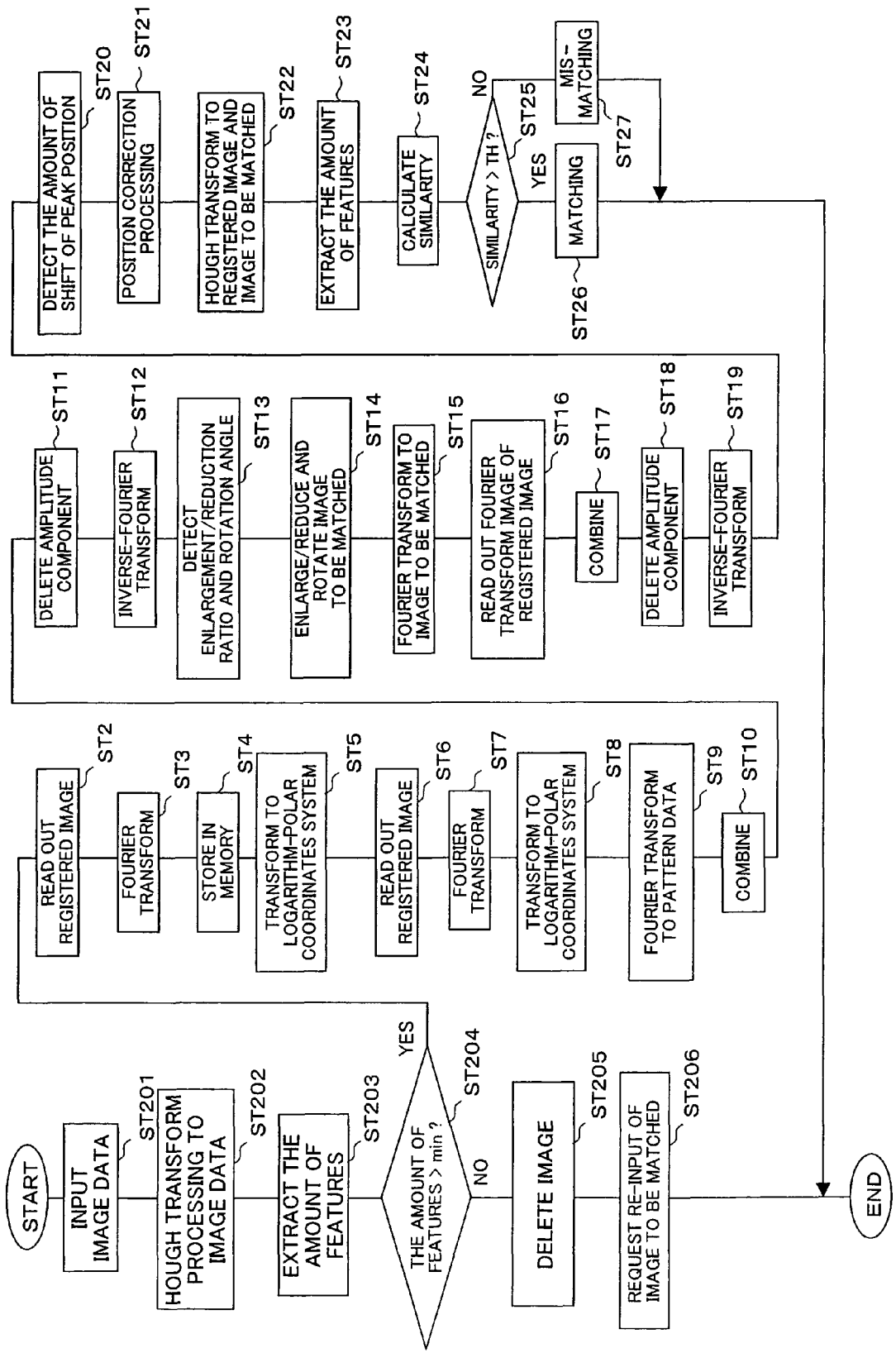

FIG. 22 is a flow chart for explaining an operation of an image matching apparatus according to a sixth embodiment according to the present invention.

DETAILED DESCRIPTION

Figure 1:
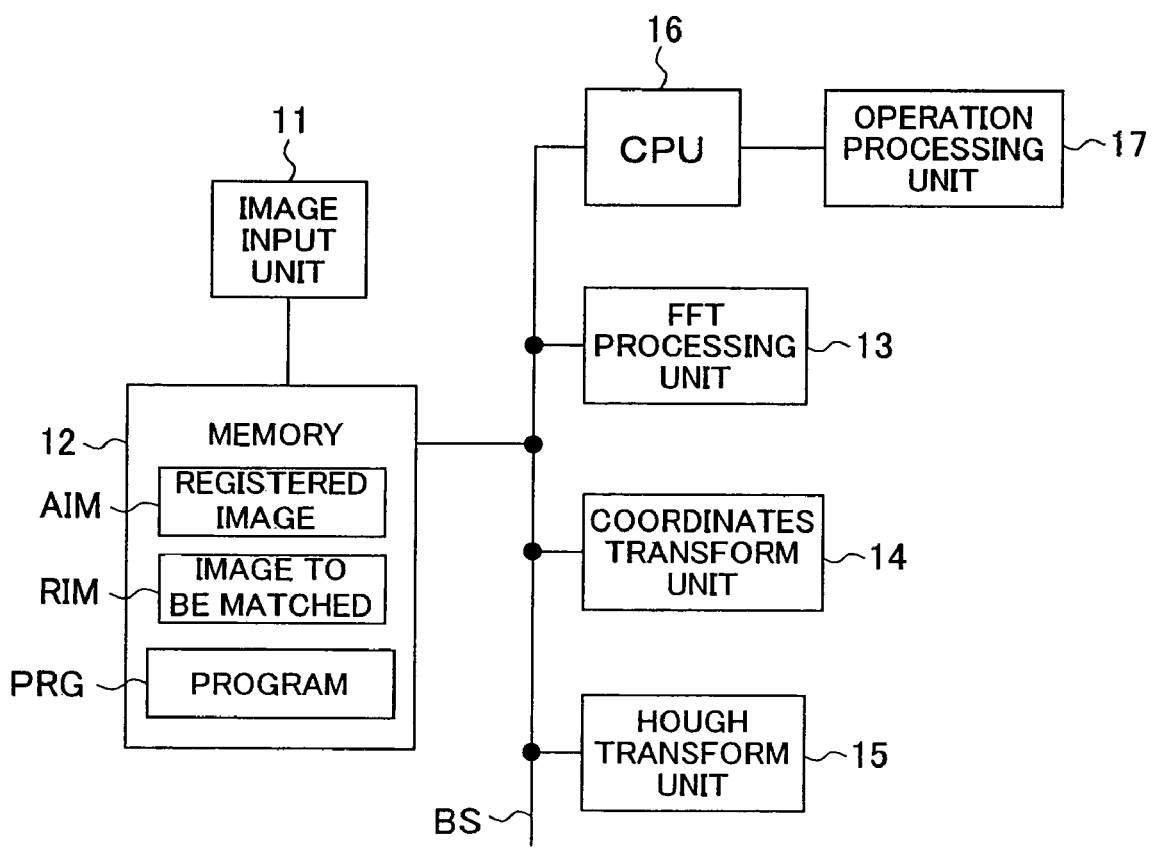
FIG. 1 is a functional block diagram illustrated in a form of hardware of an image matching apparatus of a first embodiment according to the present invention.

FIG. 1 is a functional block diagram illustrated in a form of hardware of an image matching apparatus of a first embodiment according to the present invention.

An image matching apparatus 1 according to the present embodiment, as shown in FIG. 1, has an image input unit 11, a memory 12, a FFT processing unit 13, a coordinates transform unit 14, a Hough transform unit 15, a CPU 16, and an operation processing unit 17.

For example, the image input unit 11 is connected to the memory 12. The memory 12, the FFT processing unit 13, the coordinates transform unit 14, the Hough transform unit 15, and the CPU 16 are connected by a bus BS. The operation processing unit 17 is connected to the CPU 16.

The image input unit 11 functions as an input unit for inputting an image from the outside. For example, a registered image AIM and an image to be compared with the registered image AIM (referred to an image to be matched RIM, also) are input to the image input unit 11.

The memory 12, for example, stores an image input from the image input unit 11. The memory 12 stores the registered image AIM, the image to be matched RIM, and a program PRG as shown in FIG. 1.

The program PRG is executed, for example, by the CPU 16, and includes routines for realizing functions concerning a transform processing, a correlation processing, and a matching processing, according to the present invention.

The FFT processing unit 13, for example under control of the CPU 16, performs a two-dimensional Fourier transform processing to an image stored in the memory 12, for example, and outputs the processed result to the coordinates transform unit 14 and the CPU 16.

The coordinates transform unit 14, for example under control of the CPU 16, performs a logarithm-polar coordinates transform processing to the result of the two-dimensional Fourier transform processing performed by the FFT processing unit 13, and outputs the coordinates transformed result to the CPU 16.

The operation processing unit 17 performs a predetermined processing such as a release of an electric-key in the case where the registered image AIM and the image to be matched RIM are matched, for example, based on the processed result by the CPU 16 as mentioned later.

The Hough transform unit 15 performs a Hough transform processing as mentioned later under control of the CPU 16, and outputs the processed result to the CPU 16. The Hough transform unit 15 is preferably used with an exclusive circuit formed by a hardware in order to perform, for example, the Hough transform processing at a high speed.

The CPU 16 performs a matching processing to the registered image AIM and the image to be matched RIM stored in the memory 12, for example, based on the program PRG according to the present embodiment of the present invention. The CPU 16 controls, for example, the image input unit 11, the memory 12, the FFT processing unit 13, the coordinates transform unit 14, the Hough transform unit 15, and the operation processing unit 17, to realize the operation according to the present embodiment.

FIG. 2 is a functional block diagram illustrated in a form of a software of the image matching apparatus shown in FIG. 1.

For example, the CPU 16 executes the program PRG stored in the memory 12 to realize functions of a position correction unit 161, a Hough transform unit 162, an extraction unit 163, and a judgment unit 164 as shown in FIG. 2.

The position correction unit 161 corresponds to a position correction means according to the present invention, the Hough transform unit 162 corresponds to a transform means according to the present invention, the extraction unit 163 corresponds to an extraction means according to the present invention, and the judgment unit 164 corresponds to a matching means according to the present invention.

The position correction unit 161, for example, corrects a positional shift to an image pattern in the registered image AIM and the image to be matched RIM stored in the memory 12 in a right and left direction and an up and down direction, an enlargement ratio, and a rotation angle shift of the two images, and outputs the corrected image to the Hough transform unit 162.

In detail, for example, the positional correction unit 161 performs a position correction processing to the registered image AIM and the image to be matched RIM and outputs the result as signals S1611 and S1612 to the Hough transform unit 162.

The Hough transform unit 162, for example, executes the Hough transform processing in the Hough transform unit 15 performing the exclusive Hough transform processing in hardware.

In detail, for example, the Hough transform unit 162 performs the Hough transform processing to the signal S1611 which is the registered image AIM to which the position correction processing was performed, and outputs the processing result as the signal S1621.

The Hough transform unit 162 performs the Hough transform processing to the signal S1612 which is the image to be matched RIM to which the position correction processing was performed, and outputs the result as a signal S1622.

Figure 3A:
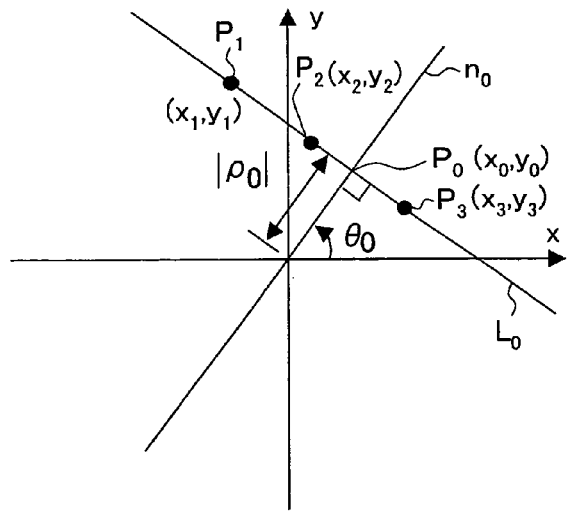
FIGS. 3A and 3B are views for explaining an operation of a Hough transform unit shown in FIG. 2.
Figure 3B:
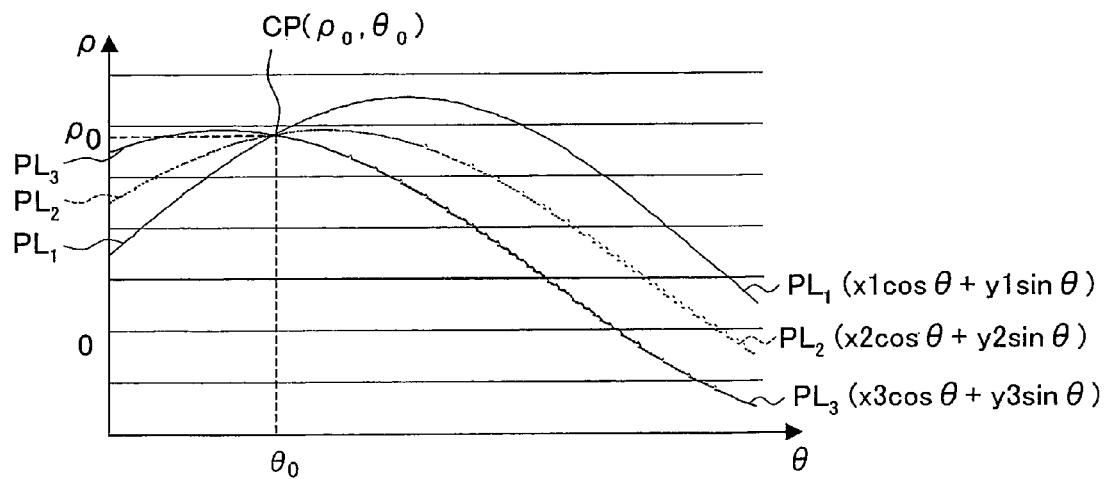

FIGS. 3A and 3B are views for explaining an operation of the Hough transform unit shown in FIG. 2.

The Hough transform unit 162 performs an image processing, for example, to the first image and the second image respectively, by which the points in each image are transformed to curved patterns and by which linear components in each image are transformed to a plurality of overlapped curved patterns, based on a distance $\rho 0$ from a reference position O to a shortest point P0 in a straight line L0 passing through a point in the image and an angle $\theta$ between a straight line n0 passing though the reference position O and the shortest point P0 and a reference axis including the reference position O, to thereby generate a first transformed image and a second transformed image.

For simplifying explanations, for example, as shown in FIG. 3A, it is assumed that, in an x-y plane, there is the straight line L0, and a position3(x1, y1), a position P2 (x2, y2), and a position P3 (x3, y3) on the straight line L0.

It is assumed that a straight line through the origin O and perpendicular to the straight line L0 is the line n0, so the straight line n0 and the x-axis as the reference axis are crossed at an angle $\theta 0$ and that the origin O and the straight line L0 are separated with a distance $|\rho 0|$, for example. Here, $|\rho 0|$ indicates the absolute value of $\rho 0$. The straight line L0 can be expressed by parameters ($\rho 0$, $\theta 0$).

The Hough transform processing performed to coordinates (x, y) in the x-y plane, is defined by formula (1), for example.

[Formula 1]

$$\rho = x \cdot \cos\theta + y \cdot \sin\theta \qquad (1)$$

For example, when the Hough transform processing expressed by the formula (1) is performed to the positions P1, P2, and P3, the positions P1, P2, and P3 are transformed to curved lines in a $\rho$-$\theta$ space as shown in FIG. 3B. In detail, by the Hough transform processing, the point P1(x1, y1) is transformed to a curved line PL1(x1·cos $\theta$+y1·sin $\theta$), the point P2(x2, y2) is transformed to a curved line PL2(x2·cos $\theta$+y2·sin $\theta$), and the point P3(x3, y3) is transformed to a curved line PL3(x3·cos $\theta$+y3·sin $\theta$).

Patterns of the curved lines (curved patterns) PL1, PL2, and PL3 are crossed at a crossed point CP($\rho 0$, $\theta 0$) in the $\rho$-$\theta$ space. The crossed point P($\rho 0$, $\theta 0$) in the $\rho$-$\theta$ space corresponds to the linear component L0 in the x-y space.

Conversely, as shown in FIG. 3A, the linear component L0 on the x-y plane corresponds to the crossed point CP of the curved patterns PL1, PL2, and PL3 on the $\rho$-$\theta$ space.

As described above, the Hough transform processing is performed to a two-binary image, it may judge which linear components dominates in the x-y plane before the transform processing, based on the degree of the overlap of the curved patterns in the above resultant $\rho$-$\theta$ space.

FIGS. 4A to 4F are views for explaining an operation of the Hough transform unit shown in FIG. 2.

Figure 4E:
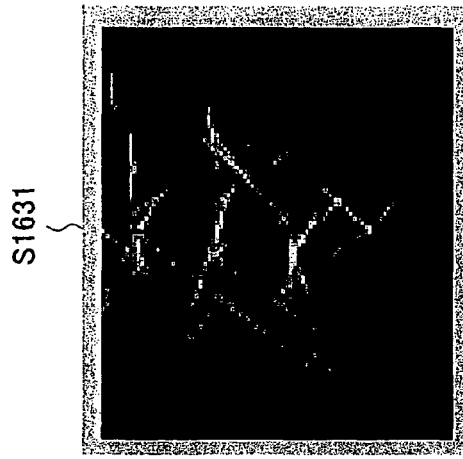
FIGS. 4A to 4F are views for explaining the operation of the Hough transform unit shown in FIG. 2.
Figure 4F:
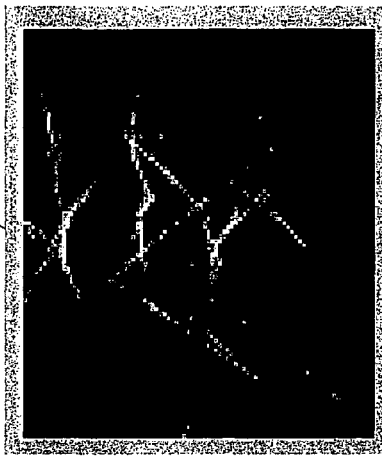
Figure 4C:
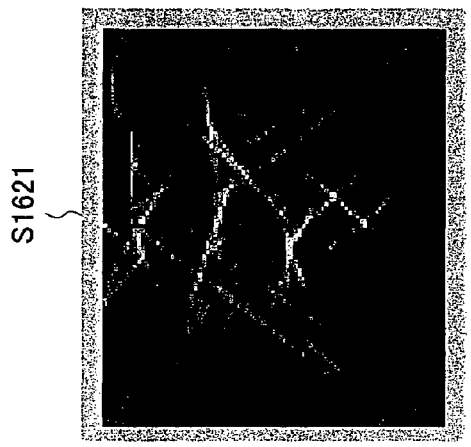
Figure 4D:
Figure 4A:
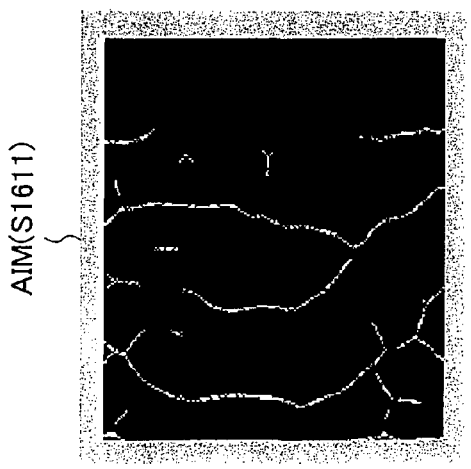
Figure 4B:
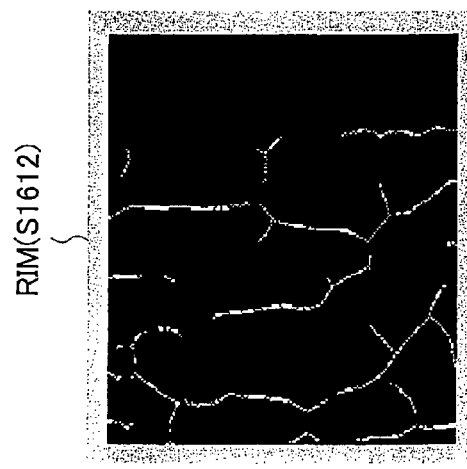

The Hough transform unit 162 performs the Hough transform processing to the registered image AIM to which the position correction processing was performed, shown in FIG. 4A for example, to generate the image S1621 shown in FIG. 4C, and performs the Hough transform processing to the image to be matched RIM to which the position correction processing was performed, shown in FIG. 4B, to generate the image S1622.

In the respective pixels included in the images S1621 and S1622, a value corresponding to the degree of the overlap of the curved patterns is set. In the present embodiment, in the images to be displayed based on a predetermined gradation, a pixel(s) in which the degree of the overlap of the curved patterns is large, is displayed in white.

As mentioned later, the matching unit 1642 performs a matching processing based on the degree of the overlap of the curved patterns, so it performs the matching processing based on the linear component in the original x-y space.

The extraction unit 163, from the respective first transformed image and the second transformed image, extracts regions each of which indicates the degree of the overlap of the curved patterns in the transformed image equal to or greater than a threshold set in advance.

In detail, the extraction unit 163, for example, extracts the region of which the degree of the overlap of the curved patterns in the transformed image is equal to or greater than the threshold set in advance, from the signal S1621 as the first transformed image shown in FIG. 4C, generates an image S1631 shown in FIG. 4E, and outputs the same to the matching unit 1642.

Also, the extraction unit 163, for example, extracts the region of which the degree of the overlap of the curved patterns in the transformed image is equal to or greater than the threshold set in advance, from the signal S1622 as the second transformed image shown in FIG. 4D, generates an image S1632 shown in FIG. 4F, and outputs the same to the matching unit 1642.

By performing the extraction processing, for example, noise components different from the linear components in the registered image AIM and the image to be matched RIM, in the x-y space, for example, point components, are deleted.

The judgment unit 164 performs the matching of the first image and the second image based on the degree of the overlap of the patterns in the first transformed image and the second transformed image and a matching or mismatching of the patterns in the two images.

In detail, the judgment unit 164 performs the matching, for example, to the signal S1631 and the signal S1632, and outputs the matched result as a signal S164.

The judgment unit 164, for example, as shown in FIG. 2, has a similarity generation unit 1641 and a matching unit 1642.

The similarity generation unit 1641, for example, performs a comparison processing to a plurality of different positional relationships in the first transformed image and the second transformed image, and generates a similarity as the correlation value based on the compared result.

In detail, the similarity generation unit 1641, for example, performs the comparison processing to a plurality of different positional relationships in the two images of the signal S1631 and the signal S1632, and generates the similarity as the correlation value based on the compared result.

For example, the similarity generation unit 1641, assuming the two images as f1(m, n) and f2(m, n), calculates a similarity Sim by applying the following formula (2) and outputs the result as S1641.

[Formula 2]

$$Sim(f1, f2) = \frac{\sum_{m=0}^{M-1} \sum_{n=0}^{N-1} f1(m,n)f2(m,n)}{\sqrt{\left\{\sum_{m=0}^{M-1} \sum_{n=0}^{N-1} f1(m,n)^2\right\}} \sqrt{\left\{\sum_{m=0}^{M-1} \sum_{n=0}^{N-1} f2(m,n)^2\right\}}} \quad (2)$$

Figure 5C:
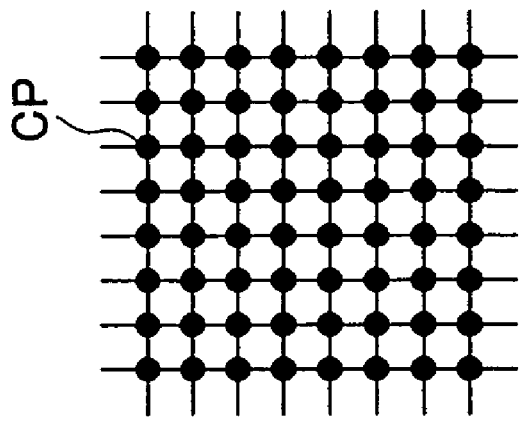
FIGS. 5A to 5C are views for explaining an operation of a similarity generation unit shown in FIG. 2.
Figure 5B:
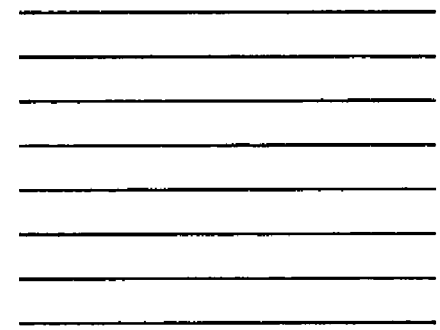
Figure 5A:
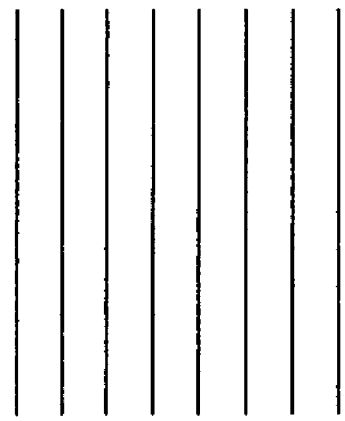

FIGS. 5A to 5C are views for explaining an operation of the similarity generation unit shown in FIG. 2.

The similarity generation unit 1641, for example, in the case where the similarity of two images including linear components (also, referred to as linear shapes) shown in FIGS. 5A and 5B is generated, generates the similarity corresponding to a number of the crossed points CP of the two images as shown in FIG. 5C. Here, for simplifying explanations, the linear components are indicated by black pixels of a bit value '1' and others are indicated by white pixels of a bit value '0'.

The matching unit 1642 performs the matching of the image to be matched RIM and the registered image AIM based on the signal S1641 indicating the similarity generated by the similarity generation unit 1641.

For example, the matching unit 1642 judges that the registered image AIM and the image to be matched RIM are matched in the case where the similarity is larger than a predetermined value.

Figure 6:
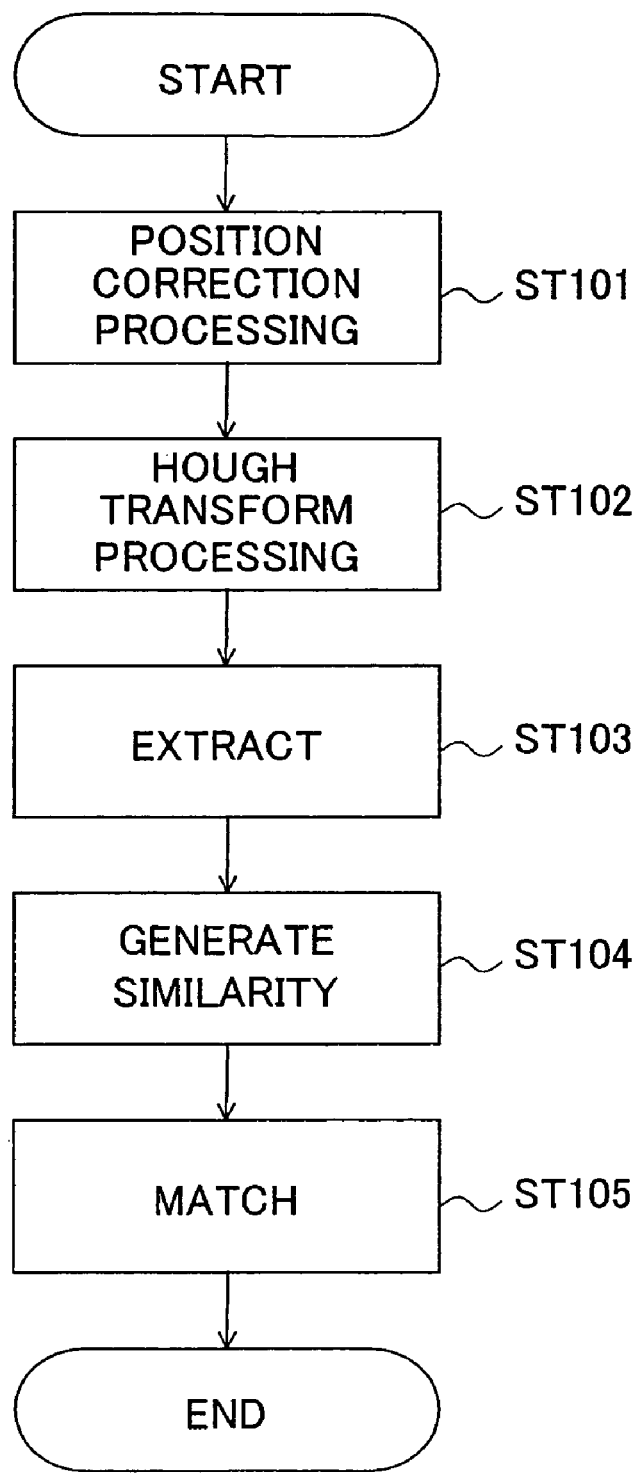
FIG. 6 is a flow chart for explaining an operation of the image matching apparatus according to the present embodiment shown in FIG. 1.

FIG. 6 is a flow chart for explaining an operation of the image matching apparatus according to the present embodiment shown in FIG. 1. While referring to FIG. 6, the operation of the image matching apparatus, mainly an operation of the CPU, will be described.

For example, the registered image AIM and the image to be matched RIM are input from the image input unit 11, and the memory 12 stores the respective input data.

At step ST101, for example as shown in FIG. 2, the position correction unit 161 performs the position correction processing based on the image patterns in the registered image AIM and the image to be matched RIM stored in the memory 12, in detail, corrects a positional shift in a right and left direction and an up and down direction, a magnification ratio, and the rotation angle shift in the two images, and outputs the corrected images as the signals S1611 and S1612 to the Hough transform unit 162.

At step ST102, the Hough transform unit 162, for example, performs the image processing to the signal S1611 being the registered image AIM to which the position correction processing was performed shown in FIG. 4A, the image processing transforming the positions in each image to the curved pattern PL and the linear components L in each image to a plurality of the overlapped curved patterns PL as shown in FIG. 3A, based on the distance ρ0 from the reference position O to the shortest point P0 in the straight line L0 passing through the point in the image and the angle θ between the straight line n0 passing through the reference position O and the shortest point P0 and the x-axis as the reference axis including the reference position O, to generate the signal S162 as the transformed image in the ρ-θ space as shown in FIG. 4C.

The Hough transform unit 162 performs the Hough transform processing, in the same way, to the signal S1612 being the image to be matched RIM to which the position correction processing was performed as shown in FIG. 4B, to generate the signal S1622 as the transformed image in the ρ-θ space as shown in FIG. 4D, for example.

At step ST103, the extraction unit 163 extracts the regions each of which indicates the degree of the overlap of the curved patterns in the transformed image equal to or greater than the threshold set in advance, from the transformed image S1621 and the transformed image S1622 respectively.

In detail, as described above, the value corresponding to the degree of the overlap of the curved patterns is set in the respective pixels in the images S1621 and S1622, and in the image to be displayed based on a predetermined gradation, portions of which the degree of the overlap of the curved patterns are high, are displayed in white.

The extraction unit 163, for example, extracts the region of which the degree of the overlap of the curved patterns in the transformed image S1621 shown in FIG. 4C is equal to or greater than the threshold set in advance, generates the image S1631 shown in FIG. 4E for example, and outputs the same to the matching unit 1642.

The extraction unit 163, for example, extracts the region of which the degree of the overlap of the curved patterns in the transformed image S1622 shown in FIG. 4D is equal to or greater than the threshold set in advance, generates the image S1632 shown in FIG. 4F for example, and outputs the same to the matching unit 1642.

The matching unit 1642 performs the matching of the image to be matched RIM and the registered image AIM based on the degree of the overlap of the patterns in the transformed images S1631 and S1632 and the matching or mismatching of the patterns in the transformed images S1631 and S1632.

In detail, at step ST104, the similarity generation unit 1641 performs the comparison processing to a plurality of the different positional relationships in the transformed images S1631 and S1632, generates the similarity Sim as the correlation value based on the compared result, for example, as expressed by the formula (2), and outputs the same as the signal S1641.

At step ST105, the matching unit 1642 performs the matching of the image to be matched RIM and the registered image AIM based on the similarity Sim functioning as the correlation value generated by the similarity generation unit 1641. In detail, the matching unit 1642 judges that the registered image AIM and the image to be matched RIM are matched in the case where the similarity Sim is greater than the threshold set in advance, otherwise judges that they are mismatched in the case where the similarity Sim is equal to or less than the threshold.

For example, the operation processing unit 17 performs a predetermined processing such as release of an electric-key in the case where the image matching apparatus according to the present embodiment is applied to a vein pattern matching apparatus in a security field.

As described above, the matching apparatus is provided with: the Hough transform unit 15 performing the Hough transform processing to the registered image AIM and the image to be matched RIM respectively, in detail, performing the image processing to the registered image AIM and the image to be matched RIM, by which the points in each image are transformed to the curved pattern PL and the linear components in each image are transformed to a plurality of the overlapped curved-patterns PL based on the distance $\rho$ from the reference position O to the shortest point P0 in the straight line L passing through the point in the image and the angle $\theta$ between the straight line n0 passing through the reference position O and the shortest point P0 and the x-axis as the reference axis including the reference position O, and generating the transformed image S1621 and the transformed image S1622; and the judgment unit 164 performing the matching of the image to be matched RIM and the registered image AIM based on the degree of the overlap of the patterns in the transformed image S1621 and the transformed image S1622 generated by the Hough transform unit 15 and the matching or mismatching of the patterns in the transformed image S1621 and the transformed image S1622. So, the matching images including the featured linear components can be performed at a high accuracy.

Namely, the Hough transform unit 15 generates the transformed images under consideration of the linear components (also, referred to a linear shapes) in the registered image AIM and the image to be matched RIM by performing the Hough transform processing, and the judgment unit 164 performs the matching of the transformed images based on the degree of the overlap of the curved patterns. So, the matching images including the featured linear components can be performed at a high accuracy.

Further, if the extraction unit 163 is provided at a subsequent stage of the Hough transform unit 162, the extraction unit 163 extracts the region of which the degree of the overlap of the curved patterns PL in either the transformed image S1621 or the transformed image S1622 is equal to or greater than the threshold set in advance, namely, deletes point components functioning as noise components on the registered image AIM and the image to be matched RIM and extracts only the linear components, and generates the images S1631 and S1632, and the judgment unit 164 performs the matching of the image to be matched RIM and the registered image AIM based on the matching or mismatching of the patterns in the extracted region. Consequently, the matching processing further improved and at a higher accuracy can be performed.

And, the judgment unit 164 is provided with: the similarity generation unit 1641 performing the comparison processing to a plurality of the different positional relationships in the transformed images, and generating the similarity Sim as the correlation value based on the compared result; and the matching unit 1642 performing the matching of the image to be matched RIM and the registered image AIM based on the generated similarity Sim. Then, the judgment unit 164 generates the similarity as the correlation value by applying a simple calculation and performs the matching processing based on the similarity. Consequently, the matching processing can be performed at a high speed.

In the present embodiment, though the position correction processing is performed at step ST101, but, it is not limited thereto. For example, in the case where the position correction processing is unnecessary, the Hough transform unit 15 may perform the Hough transform processing to the registered image AIM and the image to be matched RIM respectively. Therefore, a processing load is reduced and the matching processing can be performed at a high speed.

In the present embodiment, though, at step ST103, the extraction unit 163 extracts the region of which the degree of the overlap of the curved patterns PL is equal to or greater than the threshold set in advance, but, it is not limited thereto.

For example, the extraction unit 163 does not perform the extraction processing, and the judgment unit 164 may perform the matching of the image to be matched RIM and the registered image AIM based on the degree of the overlap of the patterns in the image S1621 and the image S1622 and the matching or mismatching of the patterns therein. Therefore, the processing load is reduced and the matching processing can be performed at a high speed.

Figure 7:
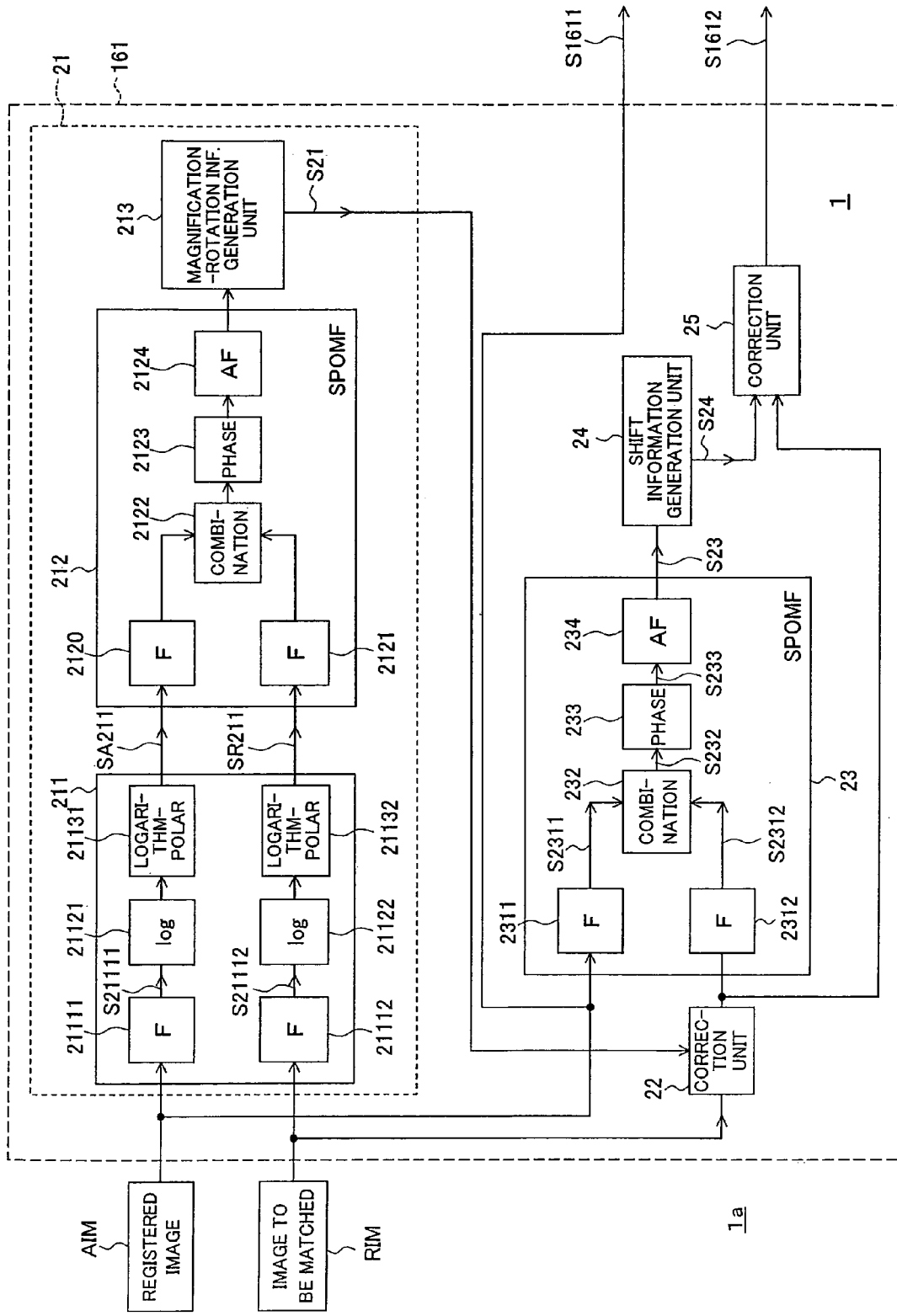
FIG. 7 is a view showing a position correction unit of an image matching apparatus of a second embodiment according to the present invention.

FIG. 7 is a block diagram showing a position correction unit of the image matching apparatus of a second embodiment according to the present invention.

The image matching apparatus 1a according to the present embodiment, in a functional block diagram illustrated as a hardware, has approximately the same configuration as the image matching apparatus 1 according to the first embodiment, and, for example, has the image input unit 11, the memory 12, the FFT processing unit 13, the coordinates transform unit 14, the Hough transform unit 15, the CPU 16 and the operation processing unit 17 as shown in FIG. 1.

In the functional block illustrated as a software, the image matching apparatus 1a has approximately the same configuration as the image matching apparatus 1 according to the first embodiment, and the CPU 16 executes the program PRG to realize the function of the position correction unit 161, the Hough transform unit 162, the extraction unit 163, and the judgment unit 164.

Components the same as those of the above embodiment are assigned the same notations (references) and explanations thereof are omitted. And only different points will be described.

The different points are the followings: the position correction unit 161, as a position correction processing, generating the correlation value based on phase components which are results of the rotation angle correction processing of the registered image AIM and the image to be matched RIM or the enlargement ratio correction processing thereof, and the Fourier transform processing thereof, and performing the position correction processing to the registered image AIM and the image to be matched RIM based on the generated correlation value.

In detail, the position correction unit 161 according to the present embodiment, as shown in FIG. 7, realizes functions of the magnification information and rotation information unit 21, the correction unit 22, the phase-only correlation unit 23, the shift information generation unit 24, and the correction unit 25 by the CPU 16 executing the program PRG and controlling the FFT processing unit 13 and the coordinates transform unit 14, for example.

The magnification information and rotation information unit 21 and the correction unit 22 perform a rotation angle correction processing or an enlargement ratio correction processing thereof to the registered image AIM and the image to be matched RIM.

The magnification information and rotation information unit 21 generates a magnification information and/or a rotation information based on the registered image AIM and the image to be matched RIM, and outputs the same as a signal S21 to the correction unit 22.

The magnification information includes an information indicating an enlargement and/or reduction ratio of the registered image AIM and the image to be matched RIM. The rotation information includes an information indicating a rotation angle of the registered image AIM and the image to be matched RIM.

In detail, for example, the magnification information and rotation information unit 21 has a Fourier and Mellin transform unit 211, a phase-only correlation unit 212, and a magnification information and rotation information generation unit 213.

The Fourier and Mellin transform unit 211 performs a Fourier and Mellin transform as mentioned later to the respective image information and outputs signals SA211 and SR211 indicating the respective transformed results to the phase-only correlation unit 212.

In detail, the Fourier and Mellin transform unit 211 has Fourier transform units 21111 and 21112, logarithmic transform units 21121 and 21122, and logarithm-polar coordinates transform units 21131 and 21132.

The Fourier transform unit 21111 performs Fourier transform as expressed by the following formula (3) to generate a Fourier image data F1(u, v) when the registered image AIM is assumed as f1(m, n) in the case where the registered image AIM is N×N pixel image, for example, and outputs the same to the logarithmic transform unit 21121. The Fourier transform unit 21112 performs Fourier transform as expressed by the following formula (4) to generate a Fourier image data F2(u, v) when the image to be matched RIM is assumed as f2(m, n) in the case where the image to be matched RIM is N×N pixel image, for example, and outputs the same to the logarithmic transform unit 21122.

The Fourier image data F1(u, v) is formed by an amplitude spectrum A(u, v) and a phase spectrum Θ(u, v) as expressed by the following formula (3). The Fourier image data F2(u, v) is formed by an amplitude spectrum B(u, v) and a phase spectrum Φ(u, v) as expressed by the following formula (4).

[Formula 3]

$$F1(u, v) = \sum_{m=0}^{N-1} \sum_{n=0}^{N-1} f1(m, n) e^{-j2\pi((mu+nv)/N)} \quad (3)$$
$$= A(u, v) e^{j\Theta(u,v)}$$

[Formula 4]

$$F2(u, v) = \sum_{m=0}^{N-1} \sum_{n=0}^{N-1} f2(m, n) e^{-j2\pi((mu+nv)/N)} \quad (4)$$
$$= B(u, v) e^{j\Phi(u,v)}$$

The logarithmic transform units 21121 and 21122 perform logarithmic processings to amplitude components of the Fourier image data F1(u, v) and F2(u, v) generated by the Fourier transform units 21111 and 21112. The logarithmic processing to the amplitude components is carried out to emphasize a high frequency component including a detail featured information of the image data.

In detail, the logarithmic transform unit 21121 performs the logarithmic processing to the amplitude components A(u, v) as expressed by the following formula (5) to generate A'(u, v), and outputs the same to logarithm-polar coordinates transform unit 21131. The logarithmic transform unit 21122 performs the logarithmic processing to the amplitude components B(u, v) as expressed by the following formula (6) to generate B'(u, v), and outputs the same to logarithm-polar coordinate transform unit 21132.

[Formula 5]

$$A'(u,v) = \log(|A(u,v)| + 1) \quad (5)$$

[Formula 6]

$$B'(u,v) = \log(|B(u,v)| + 1) \quad (6)$$

The logarithm-polar coordinates transform units 21131 and 21132 transform the signals output from the logarithmic transform units 21121 and 21122 to signals of a logarithm-polar coordinates system (for example, (log(r), Θ).

Generally, for example, when a position (x, y) is defined such as the following formulas (7) and (8), μ is equal to log(r) when R is equal to $e^\mu$, so there is unanimously (log(r), Θ) corresponding to any point (x, y). The logarithm-polar coordinates transform units 21131 and 21132 perform a coordinate transform processing based on the above nature.

[Formula 7]

$$x = e^\mu \cos \Theta \quad (7)$$

[Formula 8]

$$y = e^\mu \sin \Theta \, (0 \leq \Theta \leq 2\pi) \quad (8)$$

In detail, the logarithm-polar coordinates transform units 21131 and 21132 define a set $(r_i, \theta_j)$ expressed by the following formula (9) and a function $f(r_i, \theta_j)$ expressed by the following formula (10).

[formula 9]

$$(r_i, \theta_j) : r_i = \frac{1}{2}N^{i/N}, \theta_j = \frac{2\pi j}{N} - \pi \quad (9)$$

[formula 10]

$$f(r_i, \theta_j) = (r_i \cos\theta_j + N/2, r_i \sin\theta_j + N/2)$$

$$(i=0,1,\ldots,N-1, j=0,1,\ldots,N-1) \quad (10)$$

The logarithm-polar coordinates transform units 21131 and 21132 perform the logarithm-polar coordinates transform to the image data A'(u, v) and B'(u, v) as expressed by the following formulas (11) and (12) by applying the set $(r_i, \theta_j)$ and the function $f(r_i, \theta_j)$ defined by the formulas (9) and (10) to generate $pA(r_i, \theta_j)$ and $pB(r_i, \theta_j)$, and output the same as the signal SA211 and the signal SR211 to the phase-only correlation unit 212.

[formula 11]

$$pA(r_i, \theta_j) = A'(f(r_i, \theta_j)) \quad (11)$$

[formula 12]

$$pB(r_i, \theta_j) = B'(f(r_i, \theta_j)) \quad (12)$$

Figure 8:
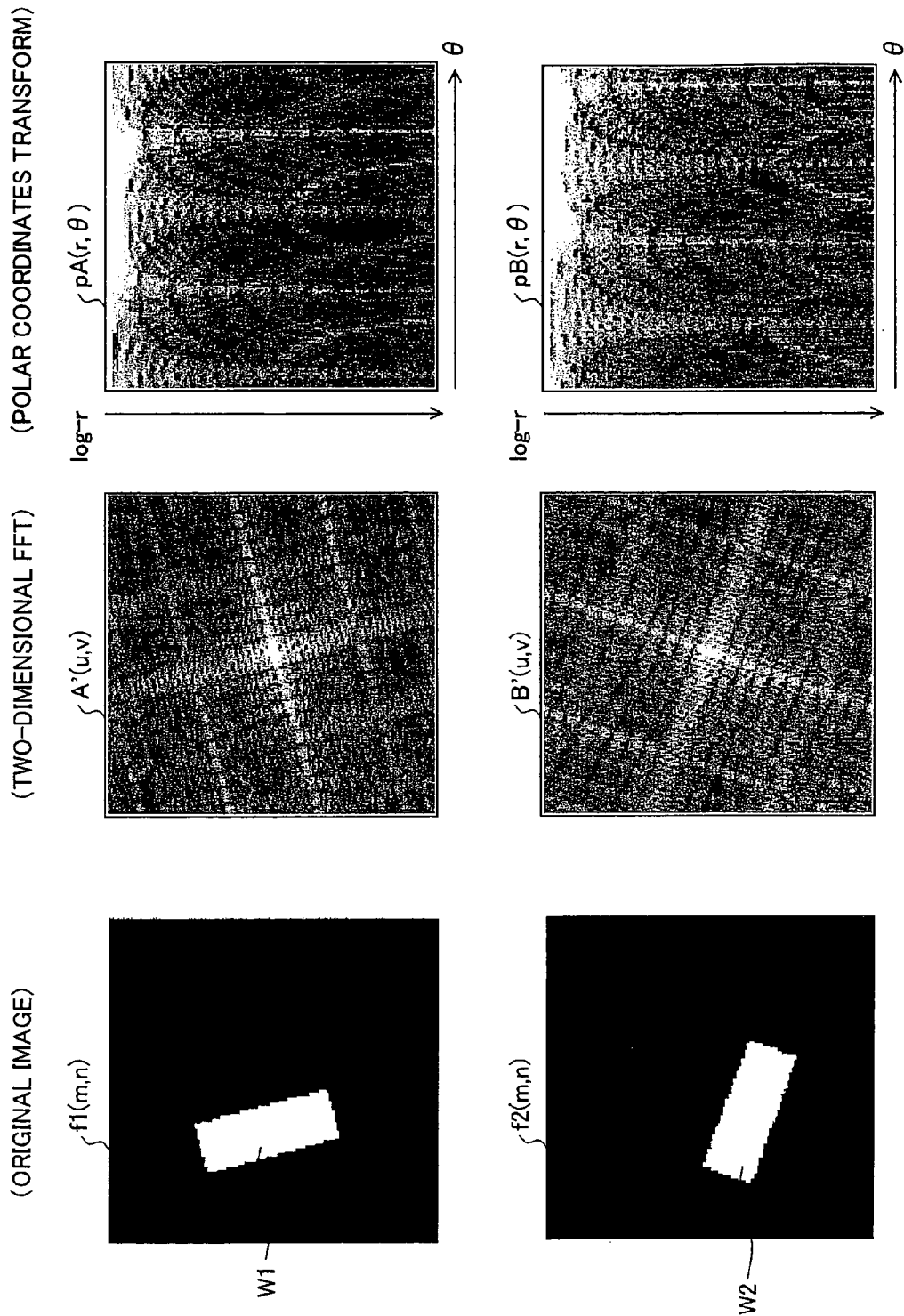
FIG. 8 is a view for explaining an operation of a Fourier and Mellin transform unit 211 shown in FIG. 7.

FIG. 8 is a view for explaining an operation of the Fourier and Mellin transform unit 211 shown in FIG. 7.

The image f1(m, n) and the image f2(m, n), for example, include rectangle regions W1 and W2 having different predetermined angles with respect to x-axis and y-axis.

In the Fourier and Mellin transform unit 211, for example as shown in FIG. 8, the Fourier transform processing is performed to the image f1(m, n) by the Fourier transform units 21111 to thereby generate a Fourier image data F1(u, v), and the image data pA(r, θ) is generated by the logarithmic transform unit 21121 and the logarithm-polar coordinates transform unit 21131.

In the same way, the Fourier transform processing is performed to the image f2(m, n) by the Fourier transform units 21112 to thereby generate a Fourier image data F2(u, v), and the image data pB(r, θ) is generated by the logarithmic transform unit 21122 and the logarithm-polar coordinates transform unit 21132.

As described above, the images f1(m, n) and f2(m, n) are transformed from Cartesian coordinates to the logarithm-polar coordinates system (also, referred to a Fourier and Mellin space) by the Fourier transform and the logarithm-polar coordinates transform.

In the Fourier and Mellin space, there is a nature that the component is moved along a log-r axis based on a scaling of an image and moved along a θ-axis based on a rotation angle of the image.

By applying the above nature, the scaling (magnification information) and a rotation angle of the images f1(m, n) and f2(m, n) may be obtained based on an amount of the shift along the log-r axis in the Fourier and Mellin space and an amount of the shift along the θ-axis.

The phase-only correlation unit 212, for example, applies a phase only correlation method used in a phase-only filter (symmetric phase-only matched filter: SPOMF) to the signal SA211 and the signal SR211 respectively indicating a pattern data output from the Fourier and Mellin transfer 211 and obtains the amount of the parallel movement thereof.

The phase-only correlation unit 212, as shown in FIG. 7, has Fourier transform units 2120 and 2121, a combination (synthesizing) unit 2122, a phase extraction unit 2123, and an inverse-Fourier transform unit 2124.

The Fourier transform units 2120 and 2121 perform Fourier transform to the signals. SA211 (pA(m, n)) and SR211 (pB(m, n)) output from the logarithm-polar coordinates transform units 21131 and 21132 by applying the following formulas (13) and (14). Here, X(u, v) and Y(u, v) indicate Fourier coefficients. The Fourier coefficient X(u, v) is formed by an amplitude spectrum C(u, v) and a phase spectrum θ(u, v) as expressed by the following formula (13). The Fourier coefficient Y(u, v) is formed by an amplitude spectrum D(u, v) and a phase spectrum φ(u, v) as expressed by the following formula (14).

[formula 13]

$$X(u,v) = \sum_{m=0}^{N-1}\sum_{n=0}^{N-1} pA(m,n)e^{-j2\pi((mu+nv)/N)} \quad (13)$$

$$= C(u,v)e^{j\theta(u,v)}$$

[formula 14]

$$Y(u,v) = \sum_{m=0}^{N-1}\sum_{n=0}^{N-1} pB(m,n)e^{-j2\pi((mu+nv)/N)} \quad (14)$$

$$= D(u,v)e^{j\phi(u,v)}$$

The combination unit 2122 combines X(u, v) and Y(u, v) generated by the Fourier transform units 2120 and 2121, and obtains the correlation. For example, the combination unit 2122 generates X(u, v)·Y*(u, v) and outputs the same to the phase extraction unit 2123. Here, Y*(u, v) is defined as a complex conjugate of Y(u, v).

The phase extraction unit 2123 deletes an amplitude component based on a combined signal output from the combination unit 2122 and extracts a phase information.

For example, the phase extraction unit 2123 extracts the phase component which is $Z(u,v) = e^{j(\theta(u,v) - \phi(u,v))}$ based on the X(u, v)Y*(u, v).

The extraction of the phase information is not limited to the above. For example, based on the output from the Fourier transform units 2120 and 2121 and the following formulas (15) and (16), the phase information is extracted and only the phase components are combined as expressed by the following formula (17) to generate Z(u, v).

[formula 15]

$$X'(u,v) = e^{j\theta(u,v)} \quad (15)$$

[formula 16]

$$Y'(u,v) = e^{j\phi(u,v)} \quad (16)$$

[formula 17]

$$Z(u,v) = X'(u,v)(Y'(u,v))^* = e^{j(\theta(u,v) - \phi(u,v))} \quad (17)$$

The inverse-Fourier transform unit 2124 performs the inverse-Fourier transform processing to the signal Z(u, v) including the only phase information and output from the phase extraction unit 2123 to generate a correlation intensity image.

In detail, the inverse-Fourier transform unit 2124 performs the inverse-Fourier transform processing on the signal Z(u, v) as expressed by the following formula (18) to generate a correlation intensity image G(p, q).

[formula 18]

$$G(p, q) = \sum_{u=0}^{N-1} \sum_{v=0}^{N-1} (Z(u, v))e^{j2\pi((up+vq)/N)} \quad (18)$$

$$= \sum_{u=0}^{N-1} \sum_{v=0}^{N-1} (e^{j(\theta(u,v)-\phi(u,v))})e^{j2\pi((up+vq)/N)}$$

The magnification information and rotation information generation unit 213 generates a correction information S21 including a data indicating a magnification information (enlargement and/or reduction ratio) and a rotation angle information of the image to be matched RIM to the registered image AIM by detecting the amount of shift between an image center and a peak position in the correlation intensity image G(p, q) generated by the inverse-Fourier transform unit 2124. The amount of the shift is equal to the amount of the parallel shift between the registered image AIM and a pattern data obtained by performing the Fourier-Mellin transform to the image to be matched RIM.

The correction unit 22 corrects the image to be matched RIM based on the correction information S21 output from the magnification information and rotation information generation unit 213 in the magnification information and rotation information unit 21. In detail, the correction unit 22 performs an enlargement and/or reduction processing and a rotation processing to the image to be matched RIM based on a magnification information and the rotation angle information included in the correction information S21, and outputs the result to the phase-only correlation unit 23. By the correction processing of the correction unit 22, a scaling difference and a rotation component difference between the registered image AIM and the image to be matched RIM are deleted.

Therefore, only a parallel movement component remains as the difference between the registered image AIM and the image to be matched RIM to which the correction processing was performed.

The phase-only correlation unit 23 detects the parallel movement component between the registered image AIM and the image to be matched RIM to which the correction processing was performed, and also detects the correlation value thereof. The detection processing, for example, is performed by applying the phase-only correlation method used in the phase-only filter described above.

In detail, the phase-only correlation unit 23 has Fourier transform units 2311 and 2312, a combination unit 232, a phase extraction unit 233, and an inverse-Fourier transform unit 234.

The Fourier transform units 2311 and 2312, the combination unit 232, the phase extraction unit 233, and the inverse-Fourier transform unit 234 have respectively the same functions as the Fourier transform units 2120 and 2121, the combination unit 2122, the phase extraction unit 2133, and the inverse-Fourier transform unit 2124 of the phase-only correlation unit 212 and explanations will be simplified.

The Fourier transform unit 2311 performs the Fourier transform processing to the registered image AIM, and outputs the result to the combination unit 232. In the above case, the registered image AIM to which the Fourier transform processing was performed by the Fourier transform unit 21111 may be stored in the memory 12, and output to the combination unit 232. Consequently, the Fourier transform is not performed two times, so the processing is reduced.

The Fourier transform units 2312 performs the Fourier transform processing to the image S22 corrected by the correction unit 22, and outputs the result of a Fourier image to the combination unit 232.

The combination unit 232 combines the Fourier images S2311 and S2312 output from the Fourier transform units 2311 and 2312, and outputs the combined image S232 to the phase extraction unit 233.

The phase extraction unit 233 extracts the phase information based on the combined image S232 as described above, and outputs a signal S233 to the inverse-Fourier transform unit 234.

The inverse-Fourier transform unit 234 performs the inverse-Fourier transform processing to the signal S233 to thereby generate a correlation intensity image (correlation image data), and outputs the same as a signal S23 to the shift information generation unit 24.

A processing for detecting the amount of the parallel movement in the above phase-only correlation method will be described in detail.

For example, the Fourier transform processing is performed to the original image f1(m, n), the original image f2(m, n), and an image f3(m, n)=f2(m+α, n+β) in which the image f2(m, n) is moved in parallel, to thereby generate Fourier coefficients F1(u, v), F2(u, v), and F3(u, v) as expressed by the following formulas (19) to (21).

[formula 19]

$$F1(u, v) = \sum_{m=0}^{N-1} \sum_{n=0}^{N-1} f1(m, n)e^{-j2\pi((mu+nv)/N)} \quad (19)$$

$$= A(u, v)e^{j\Theta(u,v)}$$

[formula 20]

$$F2(u, v) = \sum_{m=0}^{N-1} \sum_{n=0}^{N-1} f2(m, n)e^{-j2\pi((mu+nv)/N)} \quad (20)$$

$$= B(u, v)e^{j\Phi(u,v)}$$

[formula 21]

$$F3(u, v) = \sum_{m=0}^{N-1} \sum_{n=0}^{N-1} f2(m+\alpha, n+\beta)e^{-j2\pi((mu+nv)/N)} \quad (21)$$

$$= B(u, v)e^{j(\Phi(u,v)+2\pi(\alpha u+\beta v)/N)}$$

Based on the Fourier coefficients F1(u, v) to F3(u, v), phase images F'1(u, v) to F'3(u, v) including only the phase information are generated as expressed by the following formulas (22) to (24).

[formula 22]

$$F'1(u,v)=e^{j\Theta(u,v)} \quad (22)$$

[formula 23]

$$F'2(u,v)=e^{j\Theta(u,v)} \quad (23)$$

[formula 24]

$$F'3(u,v)=e^{j(\phi(u,v)+2\pi(\alpha u+\beta v)/N)} \quad (24)$$

A phase image correlation Z12(u, v) as the correlation between the phase image F'1(u, v) and the phase image F'2(u, v) is calculated as expressed by the following formula (25). A phase image correlation Z13(u, v) as the correlation between the phase image F'1(u, v) and the phase image F'3(u, v) is calculated as expressed by the following formula (26).

[formula 25]

$$Z12(u,v)=F'1(u,v)(F'2(u,v))^*=e^{j(\Theta(u,v)-\phi(u,v))} \quad (25)$$

[formula 26]

$$Z13(u,v)=F'1(u,v)(F'3(u,v))^*=e^{j(\Theta(u,v)-\phi(u,v)-2\pi(\alpha u+\beta v)/N)} \quad (26)$$

A correlation intensity image G12($r$, $s$) of the correlation Z12(u, v) and a correlation intensity image G13($r$, $s$) of the correlation Z13(u, v) are calculated as expressed by the following formulas (27) and (28).

[formula 27]

$$G12(r,s) = \sum_{u=0}^{N-1}\sum_{v=0}^{N-1}(Z12(u,v))e^{j2\pi((ur+vs)/N)} \quad (27)$$
$$= \sum_{u=0}^{N-1}\sum_{v=0}^{N-1}(e^{j(\Theta(u,v)-\Phi(u,v))})e^{j2\pi((ur+vs)/N)}$$

[formula 28]

$$G13(r,s) = \sum_{u=0}^{N-1}\sum_{v=0}^{N-1}(Z13(u,v))e^{j2\pi((ur+vs)/N)} \quad (28)$$
$$= \sum_{u=0}^{N-1}\sum_{v=0}^{N-1}(e^{j(\Theta(u,v)-\Phi(u,v)-2\pi(\alpha u+\beta v)/N)})e^{j2\pi((ur+vs)/N)}$$
$$= G12(r-\alpha, s-\beta)$$

As expressed by the above formulas (27) and (28), in the case where the image f3(m, n) is shifted to (+α, +β) in comparison with the image 2(m, n), a correlation intensity peak is generated at a position shifted to (−α, −β) in the correlation intensity image in the phase-only correlation method. The amount of the parallel movement between the two images can be obtained based on the position of the correlation intensity position.

Further, by applying the phase-only correlation method in the Fourier and Mellin space, the amount of the parallel movement in the Fourier and Mellin space can be detected. The amount of the parallel movement, as described above, corresponds to the magnification information and the rotation angle information in a real space.

FIGS. 9A to 9F are views for explaining different points between the self correlation method and the phase-only correlation method.

Figure 9A:
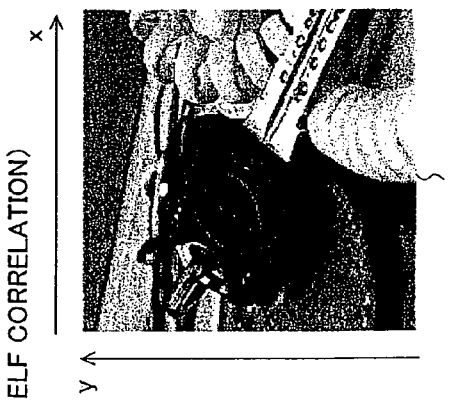
FIGS. 9A to 9F are views for explaining different points between a self-correlation method and a phase-only correlation method.
Figure 9B:
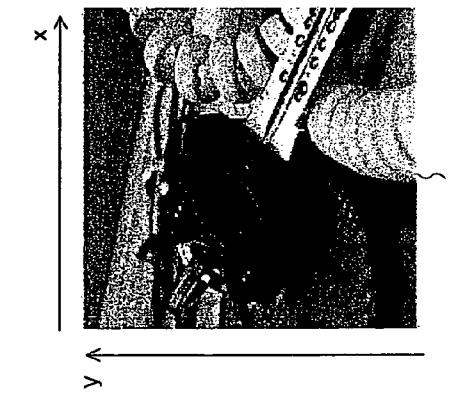
Figure 9C:
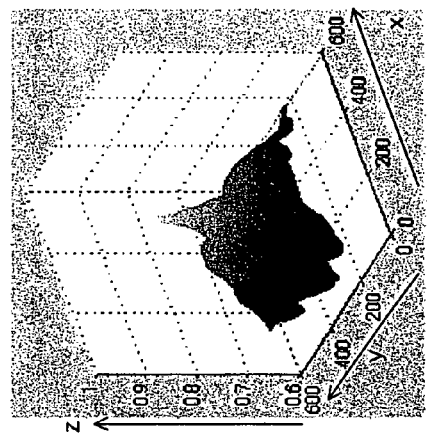
Figure 9D:
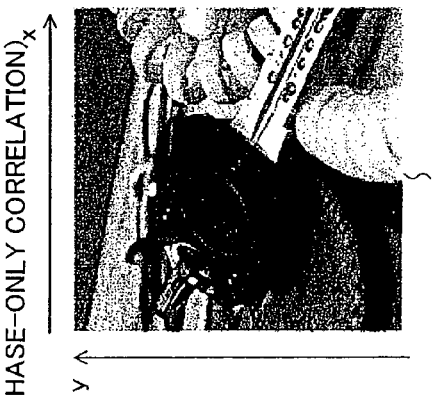
Figure 9E:
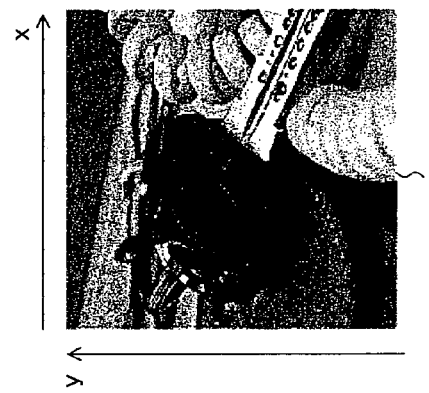

In the self correlation method, as shown in FIGS. 9A and 9B, the Fourier transform is performed to an image IM1 and an image IM2 the same as the image IM1 to thereby generate a self correlation function SG1. As shown in FIG. 9C, correlation intensity distributions including a high correlation intensity peak and a low correlation intensity peak around it, are obtained. In FIG. 9C, an ordinate (z-axis) indicates the correlation intensity, and an x-axis and a y-axis indicate the amount of the shift.

Figure 9F:
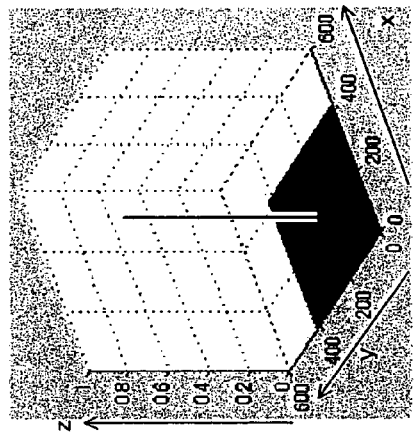

Otherwise, in the phase-only correlation method described above, as shown in FIGS. 9D and 9E, the Fourier transform is performed to the image IM1 and the image IM2 the same as the image IM1, and only the phase information is correlated, as a result, correlation distributions including only a high and sharp correlation intensity peak are obtained as shown in FIG. 9F. In this way, the performance of the phase-only method can obtain a precise information concerning the correlation in comparison with the self correlation method. In FIG. 9F, an ordinate (z-axis) indicates the correlation intensity, and an x-axis and a y-axis indicate the amounts of the shifts.

Figure 10C:
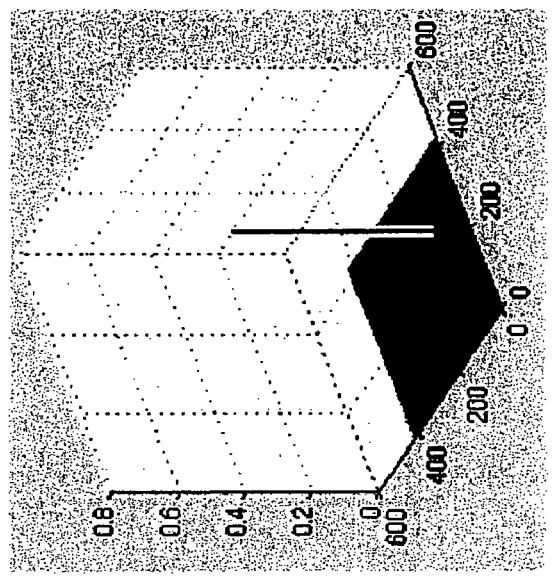
FIGS. 10A to 10C are views for explaining correlation intensity distributions in the phase-only correlation method in the case where a parallel movement shift exists between two images.
Figure 10B:
Figure 10A:
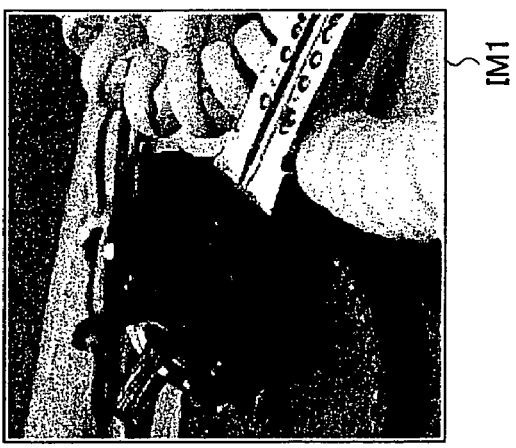

FIGS. 10A to 10C are views for explaining the correlation intensity distributions in the case where the parallel movement shift exists between two images, in the phase-only correlation method.

For example, in the correlation intensity distributions by applying the phase-only method to the image IM1 and an image IM3 in which a plurality of pixels are moved in parallel from the image IM1, shown in FIGS. 10A and 10B, a high and sharp correlation intensity peak is distributed at a position shifted from a peak position with a distance depending on the amount of the parallel movement in a correlation image data as shown in FIG. 9F. However, the peak intensity shown in FIG. 10C is smaller than that shown in FIG. 9F. This is because pixel regions where the images IM1 and IM3 are matched are smaller than that of the images IM1 and IM2.

Figure 11C:
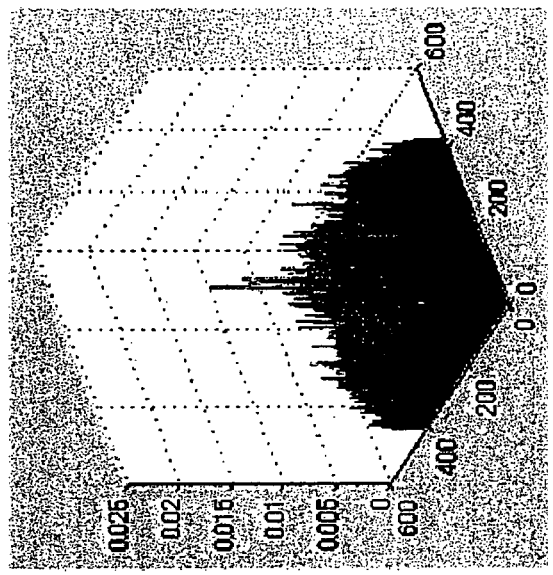
FIGS. 11A to 11C are views for explaining correlation intensity distributions in the phase-only method in the case where a rotation shift exists between two images.
Figure 11B:
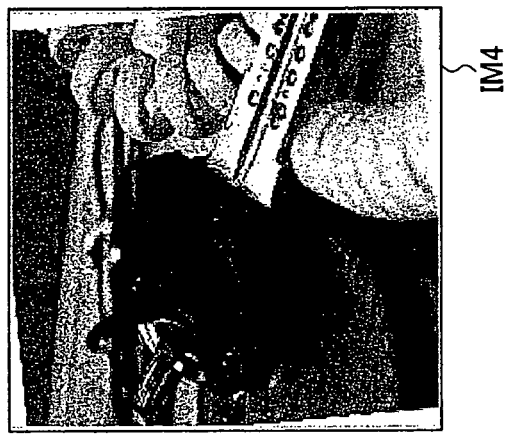
Figure 11A:
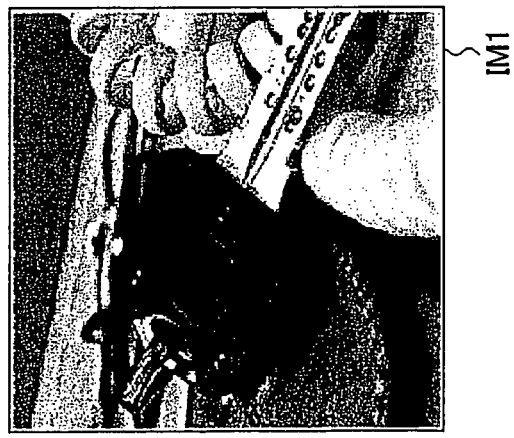

FIGS. 11A to 11C are views for explaining the correlation intensity distributions in the case where the rotation shift exists between two images, in the phase-only correlation method.

In the correlation intensity distributions by applying the phase-only method to the image IM1 and an image IM4 rotating several degrees from the image IM1, shown in FIGS. 11A and 11B, for example, a weak correlation intensity distribution is obtained as shown in FIG. 11C. In the case where the phase-only correlation method is simply applied, it is difficult to detect the correlation due to the rotation shift.

Therefore, in the image matching apparatus 1a according to the present embodiment, the Fourier and Mellin transform is performed to the registered image AIM and the image to be matched RIM, the amount of the parallel movement is detected in the Fourier and Mellin space by applying the phase-only correlation method, and the magnification information and the rotation angle information of the registered image AIM and the image to be matched RIM are detected. The magnification and the rotation angle of the image to be matched are corrected based on the above information.

The parallel movement shift between the corrected image to be matched RIM and the registered image AIM is detected by applying the phase-only correlation method, and simultaneously, the matching of the images are performed based on the correlation peak.

Figure 12C:
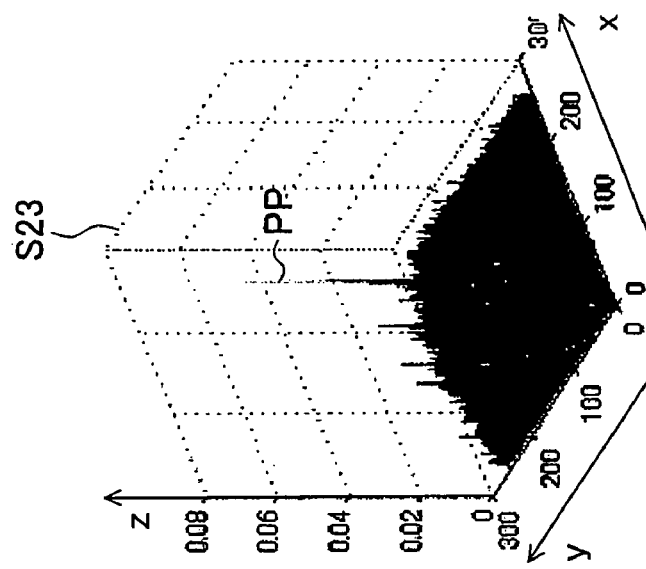
FIGS. 12A to 12C are views for explaining correlation image data output by a phase-only correlation unit 23.
Figure 12B:
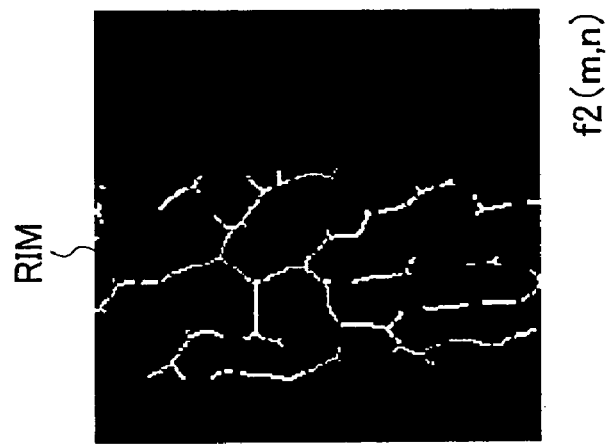
Figure 12A:
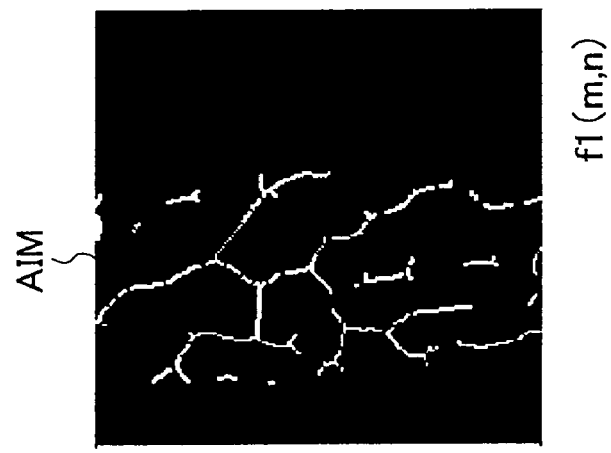
Figure 13:
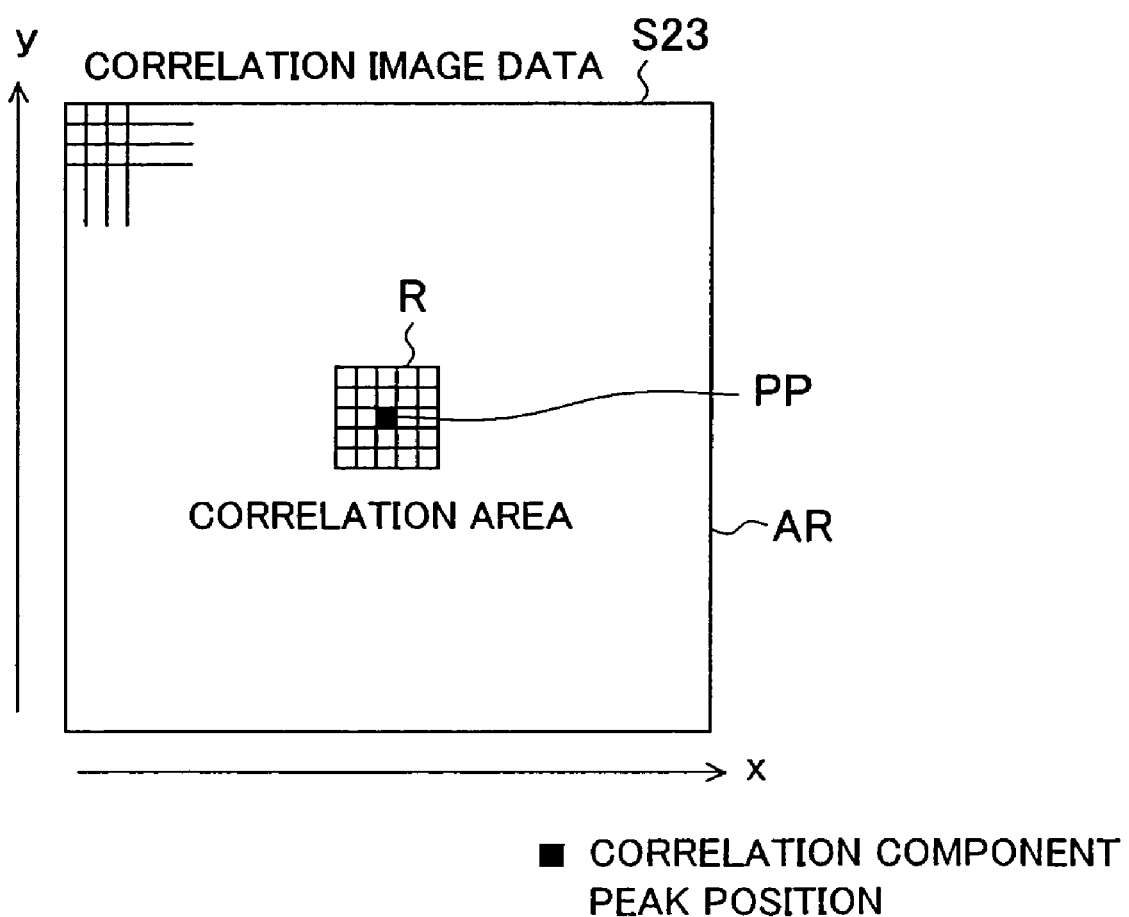
FIG. 13 is a view for explaining the correlation image data shown in FIG. 12C.

FIGS. 12A to 12C are views for explaining a correlation image data output by the phase-only correlation unit 23. FIG. 12A shows an example of the registered image AIM, FIG. 12B shows an example of the image to be matched RIM, and FIG. 12C shows a specific example of the correlation image data. FIG. 13 is a view for explaining the correlation image data shown in FIG. 12C.

In the case where a binary pattern and a linear shaped pattern of a hand-written character or a blood vessel pattern are included in the registered image AIM and the image to be matched RIM, for example, in the case of the registered image AIM and the image to be matched RIM shown in FIGS. 12A and 12B, the phase-only correlation unit 23 outputs a correlation image data shown in FIG. 12C as the signal S23.

In FIG. 12C, a z-axis direction indicates a correlation peak intensity in the correlation image data, and the correlation peak intensity corresponds to the degree of the correlation between the registered image AIM and the image to be matched RIM. As shown in FIG. 12C and FIG. 13, in a correlation peak position PP in a x-axis direction and a y-axis direction, for example, the amount of the shift from a image center corresponds to the amount of the parallel movement between the registered image AIM and the image to be matched RIM.

The shift information generation unit 24 generates the amount of the shift from the image center as a shift information based on the signal S23 output from the phase-only correlation unit 23, and outputs a signal S24 to the correction unit 25.

The correction unit 25 performs a position correction processing to the image to be matched RIM based on the image to be matched RIM and the signal S24 as the shift information output from the shift information generation unit 24, and outputs the resultant as a signal S1612.

Figure 14:
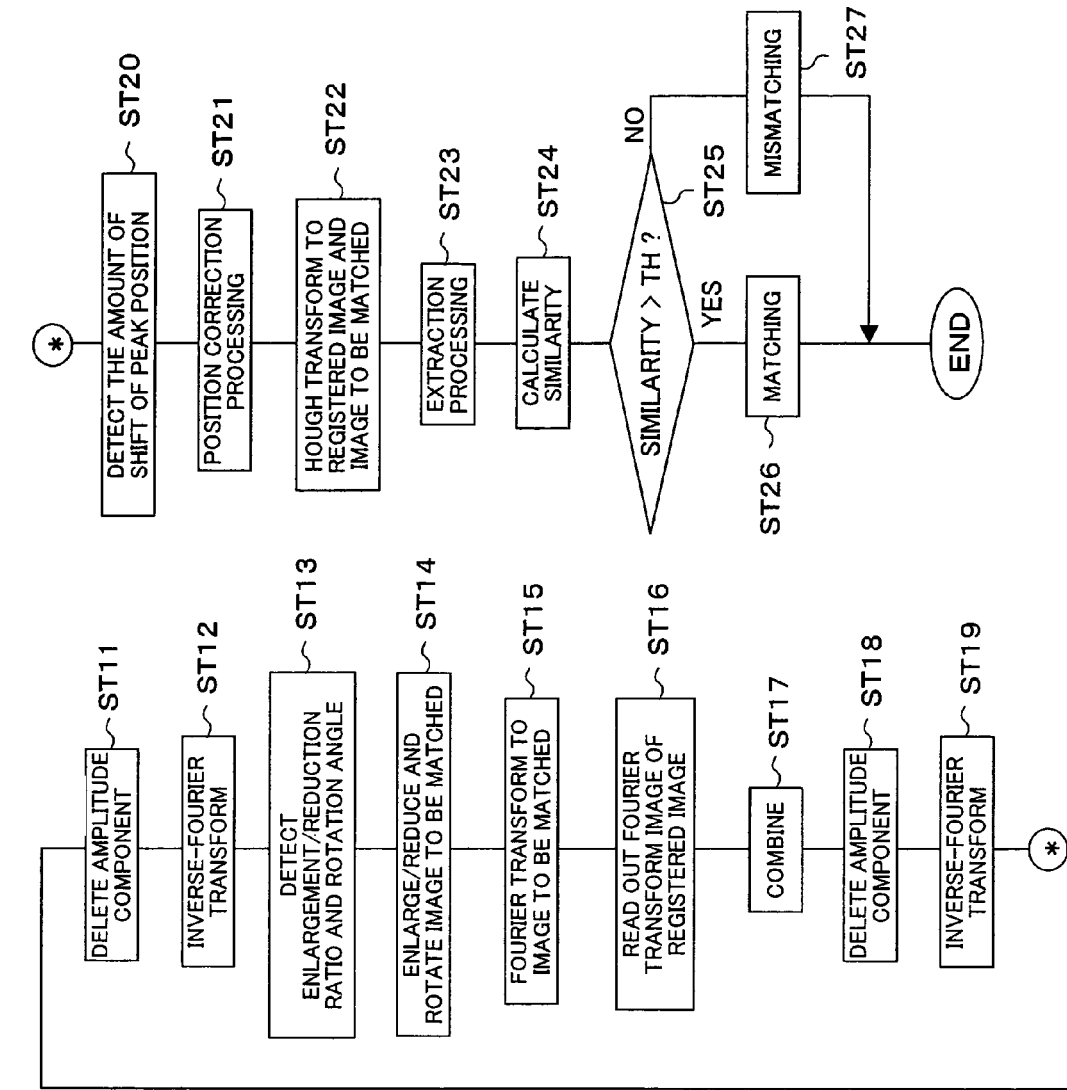
FIG. 14 is a flow chart for explaining an operation of the image matching apparatus 1 shown in FIG. 1.

FIG. 14 is a flow chart for explaining an operation of the image matching apparatus 1 shown in FIG. 1. The operation of the image matching apparatus 1a having the configuration described above will be described with reference to FIG. 14 in terms of a different point from the first embodiment.

For example, the registered image AIM and the image to be matched RIM are input from the image input unit 11, and the respective image data are stored in the memory (ST1).

Here, in order to obtain the magnifications (enlargement and/or reduction ratio) and the rotation angle information of the image to be matched RIM to the registered image AIM, the registered image AIM is read out from the memory 12 (ST2), and applied with the Fourier transform processing in the Fourier transform unit 21111 in the magnification information and rotation information unit 21 (ST3), and a generated Fourier image data S21111 is stored or recorded in the memory 12 (ST4).

An amplitude component in the Fourier image data S21111 is applied with the logarithmic processing by the logarithmic transform unit 21121, and transformed to a logarithm-polar coordinates system by the logarithm-polar coordinates transform unit 21131 (ST5).

The image to be matched RIM is read out from the memory 12 (ST6), and applied with the Fourier transform by the Fourier transform unit 21112 in the same way (ST7). The amplitude component in the Fourier image data S21112 is applied with the logarithmic processing by the logarithmic transform unit 21122, and transformed to a logarithm-polar coordinates system by the logarithm-polar coordinates transform unit 21132 (ST8).

Image signals (also, referred to pattern data) SA211 and SR211, obtained by performing the Fourier and Mellin transform to the above registered image AIM and the image to be matched RIM, are respectively applied with the Fourier transform processing by the Fourier transform units 2120 and 2121 of the phase-only correlation unit 212 (ST9), and combined by the combination unit 2122 (ST10). The amplitude component is deleted from the combined signal by the phase extraction unit 2123 (ST11), the residual phase component is applied with the inverse-Fourier transform processing by the inverse-Fourier transform unit 2124 (ST12), and a correlation information including the magnification, information and the rotation information is generated (detected) by the magnification information and rotation information generation unit 213, based on the amount of the shift between the image center and the peak position of the obtained correlation image data (ST13).

The correction unit 22 performs the correction processing for enlargement and/or reduction and the rotation processing to the image to be matched based on the correction information to thereby delete the scaling component and the rotation component between the images (ST14). The residual difference is only the parallel movement component, which is detected by applying the phase-only correlation method.

The image to be matched RIM to which the correction processing was performed, is applied with the Fourier transform by the Fourier transform unit 2312 of the phase-only correlation unit 23 (ST15) to thereby generate a Fourier image data S2312, the registered image AIM stored in the memory 12 and applied with the Fourier transform processing, is read out (ST16), and a combined data S232 is generated by the combination unit 232 (ST17).

In the above case, the registered image AIM may be applied with the Fourier transform processing in the Fourier transform unit 2311 to thereby generate the Fourier image data S2311, and output the same to the combination unit 232.

The amplitude information in the combined data S232 is deleted by the phase extraction unit 233 (ST18), the residual phase information is input to the inverse-Fourier transform unit 234, and a signal S23 is output as the correlation image data (ST19).

Based on the signal 23, the amount of the shift of the peak position is detected by the shift information generation unit 24, and the signal S24 is output as the shift information (ST20).

In the correction unit 25, the position correction processing is performed to the registered image AIM and the image to be matched RIM based on the signal S24 as the shift information and the image to be matched RIM, then a signal S1612 is output. Also, the registered image AIM is output as a signal S1611 (ST21).

The following operations are the substantially same as the first embodiment, the Hough transform unit 162 performs the Hough transform processing (ST22), the extraction unit 163 performs the extraction processing (ST23), and the similarity generation unit 1641 generates the similarity Sim (ST24).

At step ST25, the matching unit 1642 judges whether or not the similarity Sim is larger than (or exceeds) the threshold set in advance. If it is larger than the threshold, it is judged that the registered image AIM and the image to be matched RIM are matched (ST26), otherwise, if it is smaller than the threshold, it is judged that they are mismatched (ST27).

As described above, in the present embodiment, the position correction unit 161, as the position correction processing, generates the correlation value based on the phase components which are results of the rotation angle correction processing or the magnification ratio correction processing and the Fourier transform processing to the registered image AIM and the image to be matched RIM, and performs the position correction processing to the registered image AIM and the image to be matched RIM based on the generated correlation value, consequently, the position correction processing can be performed at a high accuracy, as a result, the matching processing can be performed at a high accuracy.

Figure 15:
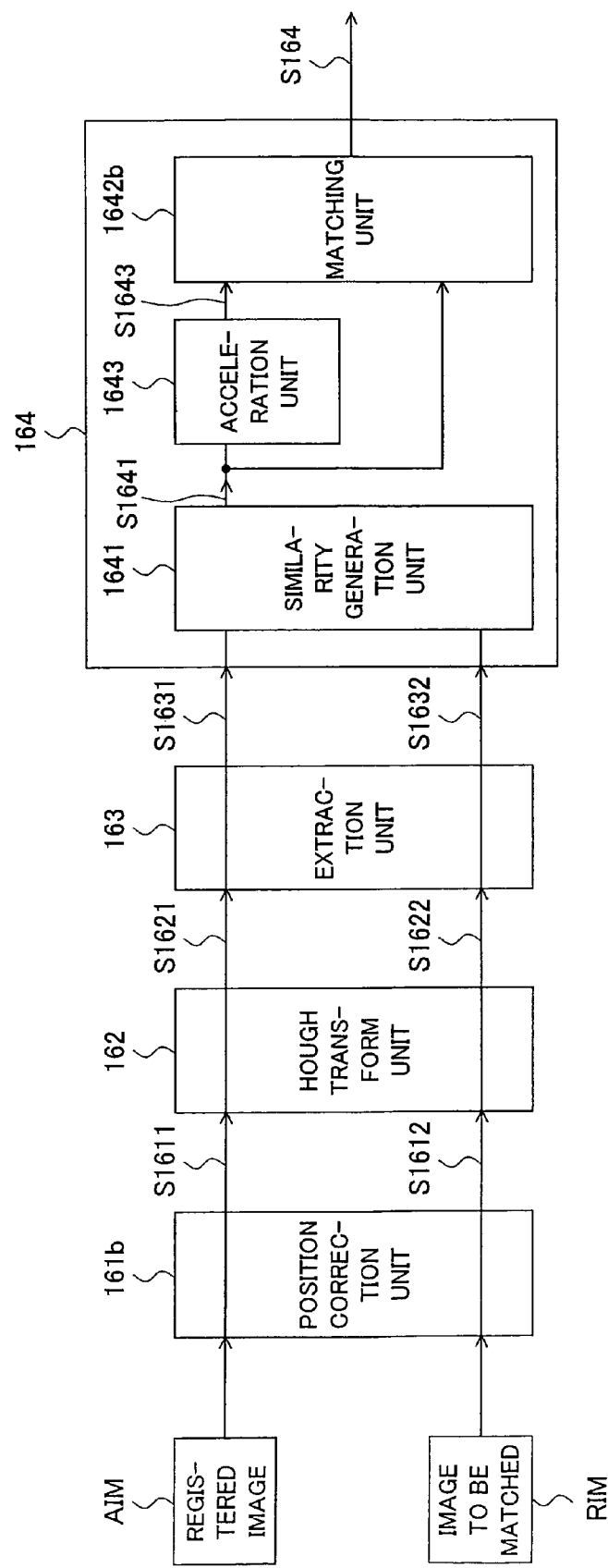
FIG. 15 is a functional block diagram of an image matching apparatus of a third embodiment according to the present invention.

FIG. 15 is a functional block diagram of an image matching apparatus of a third embodiment according to the present invention.

An image matching apparatus 1b according to the present embodiment, in the functional block diagram illustrated as a hardware, has the approximately same configuration as the image matching apparatus 1 according to the first embodiment, and, for example, has the image input unit 11, the memory 12, the FFT processing unit 13, the coordinate transform unit 14, the Hough transform unit 15, the CPU 16, and the operation processing unit 17 as shown in FIG. 1.

The image matching apparatus 1b, in the functional block diagram illustrated as a software, has the approximately same configuration as the image matching apparatus 1 according to the second embodiment, and the CPU 16 executes the program PRG to realize functions of a position correction unit 161b, the Hough transform unit 162, the extraction unit 163, and a judgment unit 164b. In FIG. 15, components the same as those of the above embodiments are assigned the same notations and explanations thereof are omitted. And only different points will be described.

A large different point is the following: the position correction unit 161*b* and the judgment unit 164*b* being different.

In the present embodiment, the position correction unit 161*b* performs the correlation processing to the registered image AIM and the image to be matched RIM to generate a plurality of the correlation value indicating the correction position, and performs a plurality of the position correction processing to the registered image AIM and the image to be matched RIM based on the generated correlation value.

Figure 16A:
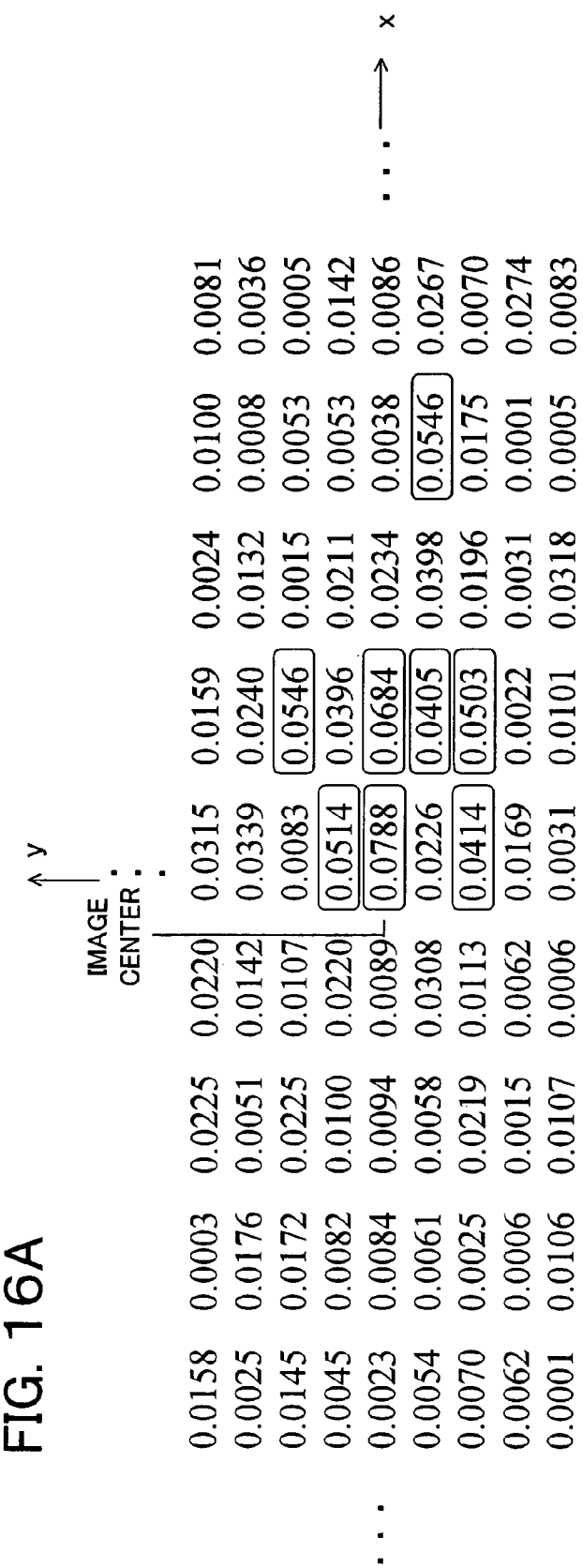
FIGS. 16A and 16B are views for explaining an operation of a position correction unit shown in FIG. 15.
Figure 16B:
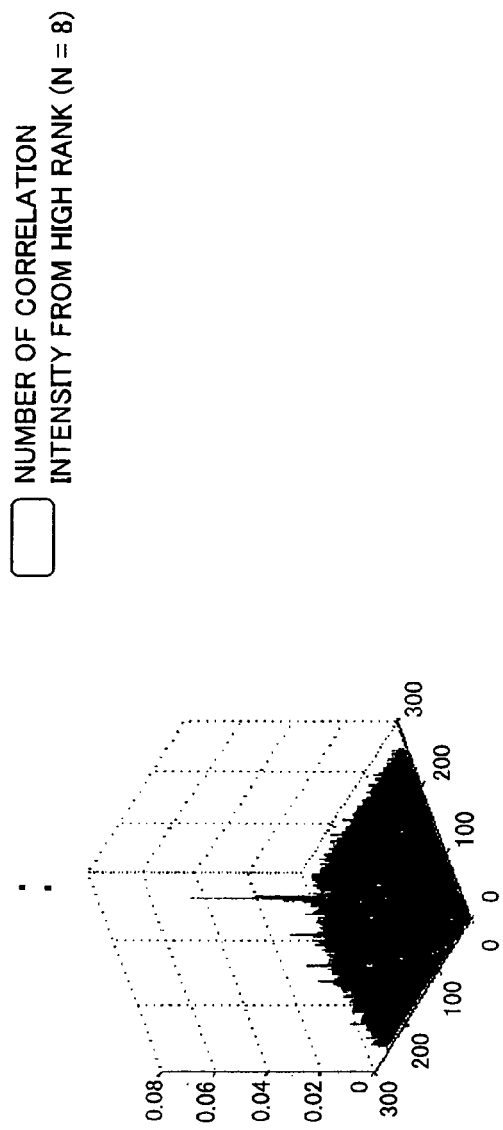

FIGS. 16A and 16B are views for explaining an operation of the position correction unit shown in FIG. 15. Numerical values indicate the correlation peak intensities of the correlation image data in the x-y plane.

For example, in the case where the registered image AIM and the image to be matched RIM include the binary linear component (linear shape) pattern, the correlation peak intensity (also, referred to a correlation intensity) is small value as shown in FIGS. 16A and 16B even if the correlation of the images is large.

For example, based on the signal S23, the shift information generation unit 24 of the position correction unit 161*b* specifies N number of the correlation intensities successively from the top as shown in FIG. 16A, for example, 8 of the correlation value and the correlation peak positions in the present embodiment, as an object of a positional relationship between the registered image AIM and the image to be matched RIM on a two-dimension.

The position correction unit 161*b* performs the plurality of the position correction processing if necessary, to a plurality of the correlation values and the position of the correlation peaks corresponding to the above values.

The Hough transform unit 162 performs the Hough transform processing to the registered image AIM and the image to be matched RIM which are results of the plurality of the position correction processing to thereby generate the transformed images S1621 and S1622.

The judgment unit 164*b* generates the correlation value based on patterns in the two transformed images, and performs the matching processing to the registered image AIM and the image to be matched RIM based on the generated correlation value and the threshold set in advance. The judgment unit 164*b* performs the matching processing to the result of the plurality of the position correction processing based on the total amount of the correlation value corresponding to different positions and the threshold set in advance.

In detail, the judgment unit 164*b* has the similarity generation unit 1641, a matching unit 1642*b*, and the accumulation unit 1643.

The similarity generation unit 1641, for example, generates the similarity Sim by applying the above formula (2) based on the signals S1631 and S1632 as described above, and outputs the same as a signal S1641 to the accumulation unit 1643 and the matching unit 1642*b*.

The accumulation unit 1643 accumulates the similarity Sim based on the signal S1641, and outputs the accumulated result as a signal S1643 to the matching unit 1642*b*.

The matching unit 1642*b* performs the matching of the image to be matched RIM and the registered image AIM based on the signal S1641 and the signal S1643.

The different point from the matching unit 1642 according to the first embodiment is the followings: the matching unit 1642*b* judging that the registered image AIM and the image to be matched RIM are matched when the signal S1643 as the accumulation value of the similarity Sim generated by the accumulation unit is larger than the predetermined threshold.

FIG. 17 is a flow chart for explaining an operation of the image matching apparatus of the third embodiment according to the present embodiment. While referring to the FIG. 14 and FIG. 17, the operation of the image matching apparatus, mainly the operation of the CPU 16, will be described in terms of the different points from the first embodiment and the second embodiment.

Steps ST1 to ST19 are the same operations as the second embodiment shown in FIG. 14 and explanations will be omitted.

Based on the correlation image data S23 output from the phase-only correlation unit 23 at step ST19, N number of objects $P_i$ ($P_0, P_1, P_2, \ldots, P_{n-1}$) are extracted successively from the upper side of the correlation peak intensity in the correlation image data S23 by the shift information generation unit 24 (ST28).

At step ST29, the accumulation unit 1643 initializes variables for accumulation. For example, the variable i is initialized to 0 and the accumulation value S is initialized to 0.

The correction unit 25 performs the position correction processing to the registered image AIM and the image to be matched RIM based on the respective objects (coordinates) $P_i$ and the amount of the shift corresponding to the object from the center position and the correlation image data (ST30).

As described above, the Hough transform processing is performed to the registered image AIM and the image to be matched RIM by the Hough transform unit 162 (ST31), the extraction processing is performed by the extraction unit 163 (ST32), and the similarity Sim(i) is calculated by the similarity generation unit 1641 and output to the accumulation unit 1643 and the matching unit 1642*b* (ST33).

The matching unit 1642*b* compares the similarity Sim(i) with a first threshold th1 set in advance. In the case where the similarity Sim(i) is smaller than the first threshold (ST34), the accumulation unit 1643 accumulates the similarity Sim(i), in detail, accumulates the same by formula S=S+Sim(i) and outputs the result to the matching unit 1642*b* (ST35).

At step ST35, the matching unit 1642*b* compares the accumulation value S with a second threshold th2 set in advance (ST36), the variable i and a value N−1 are compared in the case where the accumulation value S is smaller than the second threshold th2 (ST27), the variable i is added with one in the case where the variable i dose not matched N−1 (ST28), and the routine returns to step ST30. At step ST27, in the case where the variable i matches N−1, the images are mismatched (ST39).

On the other hand, in the comparison processing at step ST34, the matching unit 1642*b* judges that the images are matched in the case where the similarity Sim(i) is equal to or larger than the first threshold. In the comparison processing at step ST36, the matching unit 1642*b* judges that the images are matched in the case where the accumulated value S is equal to or larger than the second threshold th2 (ST40). For example, in the case where the image matching apparatus according to the present embodiment is applied to a vein pattern matching apparatus in a security field, the operation processing unit 17 performs a processing such that the electric key is released.

As described above, in the present embodiment, the position correction unit 161 generates a plurality of the correlation value indicating the positions to be corrected, performs the plurality of the position correction processing to the registered image AIM and the image to be matched RIM based on the generated correlation value. The Hough transform unit 162 performs the Hough transform processing as an image processing to the registered image AIM and the image to be matched RIM which are results of the plurality of the position correction processings. And the matching unit 1642*b* performs the matching processing to the accumulation value of the similarity as the correlation value corresponding to the pattern in each of the transformed images. Consequently, for example even if the correlation between the two image data to be compared is small, the similarity calculated in the respective positional relationships in the objects are accumulated, so the matching can be performed at a high accuracy in comparison with the case where the matching is performed by applying only the similarity.

When the similarity Sim is larger than the first threshold th1, the matching unit judges that the two images are matched, so the matching processing can be performed at high speed.

Figure 18:
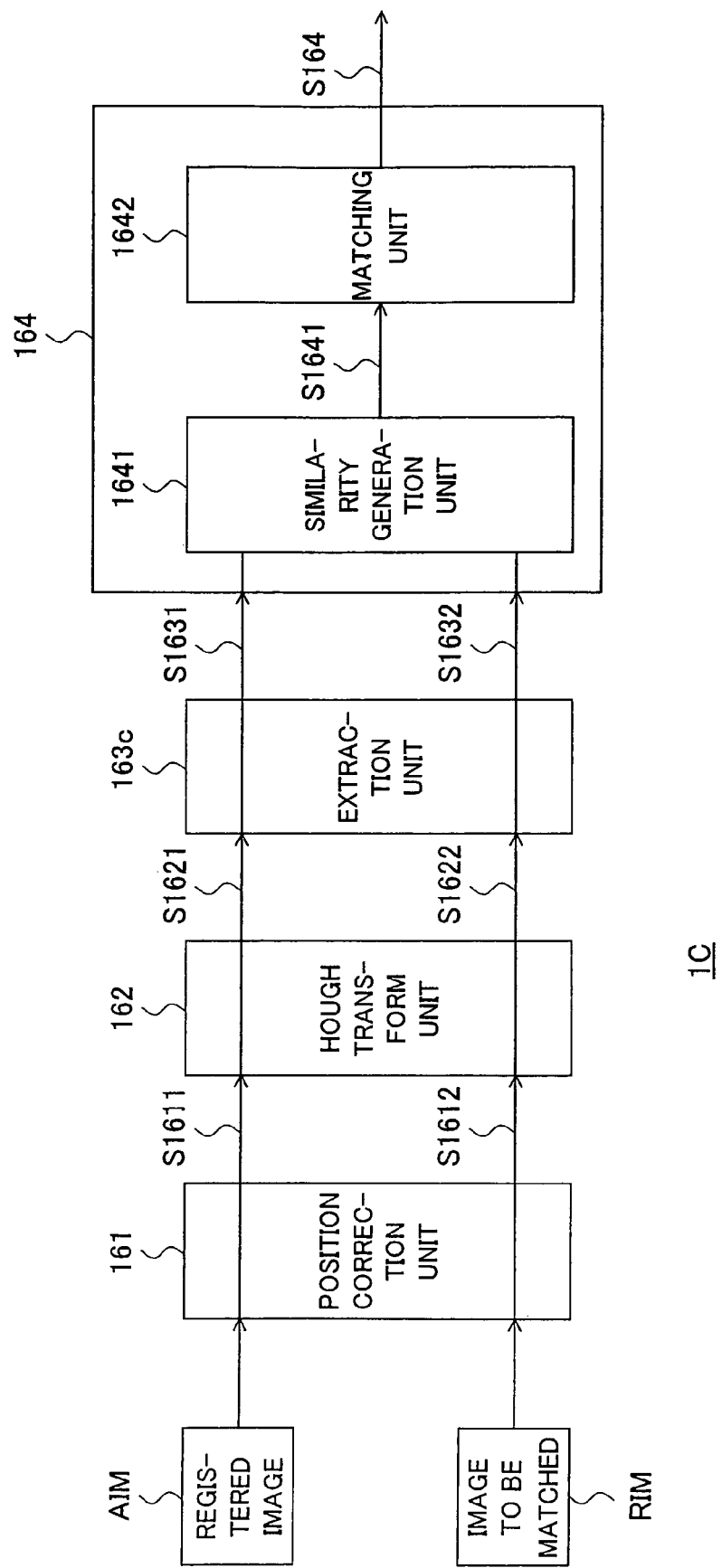
FIG. 18 is a functional block diagram of an image matching apparatus of a fourth embodiment according to the present invention.

FIG. 18 is a functional block diagram of an image matching apparatus of a fourth embodiment according to the present invention.

An image matching apparatus 1c according to the present embodiment, in the functional block diagram illustrated in a hardware, has the approximately same configuration as the image matching apparatus 1 according to the above embodiment, and, for example, has the image input unit 11, the memory 12, the FFT processing unit 13, the coordinate transform unit 14, the Hough transform unit 15, the CPU 16, and the operation processing unit 17 as shown in FIG. 1.

The image matching apparatus 1c, in the functional block diagram illustrated in a software, has the approximately same configuration as the image matching apparatus according to the above described embodiments, and the CPU 16 executes the program PRG to realize functions of the position correction unit 161, the Hough transform unit 162, an extraction unit 163c, and the judgment unit 164. In FIG. 18, components the same as those of the above embodiments are assigned the same notations and explanations thereof are omitted. And only different point will be described.

A large different point is the following: the extraction unit 163c being different.

In the present embodiment, the extraction unit 163c extracts regions where the degree of the overlap of the curved patterns in the transformed image is equal to or greater than the threshold set in advance, from the first transformed image and the second transformed image, and determines the threshold based on a size of the extracted region such that the size of the extracted region is larger than the set value.

The extraction unit 163c determines the threshold based on the size of the extracted region such that the size of the extracted region is within the set range.

FIGS. 19A to 19F are views for explaining an operation of the image matching apparatus 1c shown in FIG. 17.

FIG. 19A is a view showing a specific example of an image IM11. FIG. 19B is a view showing an image in which a region equal to or greater than the first threshold is extracted from the image IM11 shown in FIG. 19A. FIG. 19C is a view showing an image in which a region equal to or greater than a second threshold larger than the first threshold is extracted from the image IM11 shown in FIG. 19A.

FIG. 19D is a view showing a specific example of an image IM12. FIG. 19E is a view showing an image in which a region equal to or greater than the first threshold is extracted from the image IM12 shown in FIG. 19D. FIG. 19F is a view showing an image in which a region equal to or greater than a second threshold larger than the first threshold is extracted from the image IM12 shown in FIG. 19D.

For example, in the above described embodiments, when performing the Hough transform processing to the registered image and the image to be matched prior to extracting the amount of features (parameter) from the transformed image, since the threshold is fixed, the sufficient amount of features may not be extracted or the redundant amount of the features may be extracted depending on the images.

In detail, when performing the Hough transform processing to the image IM11 shown in FIG. 19A before extracting the region larger than the first threshold from the transform image, an image IM111 shown in FIG. 19B is generated, otherwise, when extracting the region larger than the second threshold, an image IM112 shown in FIG. 19C is generated.

When performing the Hough transform processing to the image IM12 shown in FIG. 19D prior to extracting the region larger than the first threshold from the transform image, an image IM121 shown in FIG. 19E is generated, otherwise, when extracting the region larger than the second threshold, an image IM122 shown in FIG. 19F is generated.

For example, the images IM112 and IM121 are specific examples including the amount of the data (features) appropriate to the matching processing.

The image IM111 is a specific example including the amount of the data (features) redundant to the matching processing.

The image IM122 is a specific example extracted with the amount of data (features) insufficiently to the matching processing.

In the case of where the threshold is fixed, for example, the comparison and matching processing is performed to the image IM111 and the image IM121 or the image IM112 and the image IM122, so judgment accuracy may sometimes be insufficient.

For example, while changing the threshold, the comparison and matching processing are performed to the image IM112 and the image IM121 including the amount of data (features) sufficiently to the matching processing, so the judgment accuracy is improved.

Therefore, the extraction unit 163c according to the present embodiment, in the case where the amount of features extracted by applying a certain threshold is the out of the suitable range for the matching when extracting the amount of features to the transformed image to which the Hough transformed processing was performed, changes the threshold and extracts the amount of the features again, and determines the amount of feature so as to be within the suitable range.

FIG. 20 is a flow chart for explaining an operation of the image matching apparatus according to the present embodiment. While referring to FIG. 20, the operation of the image matching apparatus, mainly a different point from the embodiment shown in FIG. 14, will be described.

The operations of steps ST1 to ST22 are the same and explanations will be omitted.

At step ST231, the extraction unit 163c extracts a parameter portion exceeding the threshold set in advance from the respective transformed images S1612 and S1622 generated by the Hough transform unit 162, as the amount of features.

The extraction unit 163c determines the threshold based on the size of the extracted region such that the size of the extracted region is within the set range.

In detail, the extraction unit 163c determines the threshold such that the size of the extracted region is larger than the minimum value min based on the size of the extracted region, also determines the same such that the size of the extracted region is smaller than the maximum value max larger than the minimum value min.

For example, at step ST232, the extraction unit 163c judges whether or not the size of the region extracted as the amount of features is larger than the minimum value min, and reduces the threshold at a predetermined amount if it judges it is not larger (ST233), the routine returns to step ST321.

Otherwise, at step ST232, the extraction unit 163c judges that the size of the region extracted as the amount of features is larger than the minimum value min, the routine proceeds to step ST234.

At step ST234, the extraction unit 163c judges whether or not the size of the region extracted as the amount of the features is smaller than the maximum value max, and increases the threshold at the predetermined amount if it judges it is not smaller (ST233), the routine returns to step ST231.

Otherwise, at step ST234, the extraction unit 163c judges that the size of the region extracted as the amount of the features is smaller than the maximum value max, the routine proceeds to step ST24.

The following steps of step ST24 are the same as the processing shown in FIG. 14 and explanations will be omitted.

As described above, the extraction unit 163c determines the threshold such that the size of the extracted region is within the set range based on the size of the extracted region, so data redundant to the matching processing can be reduced and data suitable for the matching processing can be extracted.

The image appropriate for the matching processing can be obtained, so the matching unit 164 can perform the matching processing at a high accuracy.

In the case where an imaging system increasingly changes and the amount of data of the input image sharply changes, the comparison and matching processing can be performed without any change.

FIG. 21 is a flow chart for explaining an operation of an image matching apparatus of a fifth embodiment according to the present invention.

The image matching apparatus according to the present embodiment, in the functional block diagram illustrated in a hardware, has the approximately same configuration as the image matching apparatus according to the above embodiments, and, for example, has the image input unit 11, the memory 12, the FFT processing unit 13, the coordinate transform unit 14, the Hough transform unit 15, the CPU 16, and the operation processing unit 17 as shown in FIG. 1.

For example, in the case where the amount of features of the registered image and the image to be matched is remarkably few, the amount of the features insufficient to the comparison and matching processing may be obtained, so an insufficient judgment accuracy may be obtained.

The image matching apparatus according to the present embodiment extracts the region where the degree of the overlap of the curved patterns in the transformed image is equal to or greater than the threshold set in advance, the image is deleted in the case where the size of the extracted region is smaller than the set value.

While referring to FIG. 21, mainly a different point from the above embodiments in the case where a certain image data is stored as the registered image for matching will be described, for example, in an application of a personal matching apparatus applied with a blood vessel pattern.

At step ST101, the CPU 16 causes the image input unit 11 to capture an image data to be stored as the registered image AIM, and stores the image data in the memory 12. The CPU 16 causes the Hough transform unit 15 to perform the Hough transform processing to the captured image data (ST102).

At step ST103, the CPU 16 extracts a region exceeding the threshold set in advance as the amount of the features (ST103).

At step ST104, the CPU 16 judges whether or not the size of the extracted region is larger than the minimum value min which is minimum necessary for the matching processing, decides that the amount of the information sufficiently to the registered image AIM is included if it is judged to be larger, and stores the image data in the memory 12 (ST105).

Otherwise, at step ST104, if it is judged not to be larger than the minimum value min, the input image is deleted (ST106), and a re-input of the image data is requested, for example, by displaying a notice that the amount of the information as the registered image AIM is insufficiency (ST107). Then, the above described matching processing is performed.

In the present embodiment as described above, in registering an image, the region where the degree of the overlap of the curved patterns in the transformed image to be registered is equal to or greater than the threshold set in advance is extracted, then the image is deleted in the case where the size of the extracted region is less than the set value (the minimum value min), so the image to be registered having relatively large amount of the features concerning the matching apparatus can be obtained steadily. And the matching processing can be performed at a high accuracy.

FIG. 22 is a flow chart for explaining an operation of an image matching apparatus of a sixth embodiment according to the present embodiment.

The case where the image to be matched RIM input from an external is matched with the registered image AIM stored in the memory 12 in advance, will be described with reference to FIG. 22.

At step ST201, the CPU 16 causes the image input unit 11 to capture the image data as the image to be matched RIM, and stores the image data in the memory 12. The CPU 16 causes the Hough transform unit 15 to perform the Hough transform processing to the captured image to be matched (ST202).

At step ST203, the CPU 16 extracts the region exceeding the threshold set in advance as the amount of the features (ST203).

At step ST204, the CPU 16 judges whether or not the size of the extracted region is larger than the minimum value min which is minimum necessary for the matching processing, decides that the amount of the information is no sufficient to the image to be matched RIM if it is judged not to be larger, deletes the image (ST205), requests the re-input of the image data, for example, by displaying a notice that the amount of the information is not sufficient (ST206), and terminates the matching processing.

Otherwise, in the judgment at step ST204, if it is judged to be larger than the minimum value min, the CPU 16 judges that the amount of information is sufficient to the image to be matched RIM, the routine proceeds to the following matching processing of steps ST2 to ST27.

The following operations of steps ST2 to ST27 are the same as the operation shown in FIG. 14 and explanations will be omitted.

As described above, in the present embodiment, in matching images, the region where the degree of the overlap of the curved patterns in the transformed image to be matched is equal to or greater than the threshold set in advance, is extracted, and the image is deleted in the case where the size of the extracted region is less than the set value (the minimum value min), so the image to be matched including relatively large amount of the features applied to the matching apparatus can be obtained steadily. And the matching processing can be performed at a high accuracy.

Note that, the present invention is not limited to the present embodiments and it can be modified in various ways.

For example, in the present embodiment, though the similarity generation unit calculates the similarity by applying the formula (2), it is not limited thereto. For example, the similarity generation unit may perform a processing in which the similarity suitable to the correlation of the linear components (linear shaped patterns) is calculated.

In the present embodiment, though the Fourier transform processing, the logarithmic transform processing, and a logarithm-polar coordinates transform processing are performed and the amount of parallel movement on the Fourier and Mellin space is calculated to thereby generate the magnification information and the rotation angle information, it is not limited thereto. For example, the coordinates transform processing may be performed on a space detectable to the magnification information and the rotation angle information.

Though the first threshold th1 and the second threshold th2 are fixed value, it is not limited thereto. For example, the respective thresholds are variable depending on an image pattern, so the matching processing can be performed at a higher accuracy.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method of operating an image matching apparatus including instructions, the method comprising:
   (a) causing a processor to execute the instructions to perform position correction processing to a first image and a second image, the first image including: (i) first points; and (ii) first linear components, the second image including: (i) second points; and (ii) second linear components;
   (b) after performing the position correction processing, causing the processor to execute the instructions to transform:
      (i) the first points of the first image and the second points of the second image to a curved pattern; and
      (ii) the first linear components of the first image and the second linear components of the second image to a plurality of overlapped curved-patterns, said transformation being based on a distance from a reference position to a shortest point in a straight line passing through a point in the image and an angle between a straight line passing though the reference position and the shortest point and a reference axis including the reference position;
   (c) causing the processor to execute the instructions to generate a first transformed image and a second transformed image; and
   (d) causing the processor to execute the instructions to match the first image and the second image based on a degree of an overlap of the patterns in the first transformed image and the second transformed image and a matching or mismatching of the patterns in the first and second transformed images.

2. The method of claim 1, which includes:
   (a) causing the processor to execute the instructions to extract regions each of which indicates a degree of the overlap of the curved patterns in the transformed image equal to or greater than a threshold set in advance, from the first transformed image and the second transformed image; and
   (b) causing the processor to execute the instructions to match the first image and the second image based on the matching or mismatching of the patterns in the regions extracted from the first transformed image and the second transformed image respectively.

3. The method of claim 2, which includes causing the processor to execute the instructions to determine the threshold based on a size of the extracted region such that the size of the extracted region is larger than the set value.

4. The method of claim 2, which includes causing the processor to execute the instructions to determine the threshold based on the size of the extracted region such that the size of the extracted region is within the set value.

5. The method of claim 2, which includes causing the processor to execute the instructions to delete the image when the size of the extracted region is less than the set value.

6. The method of claim 1, which includes causing the processor to execute the instructions to perform Hough transform processing to the first image and the second image to generate the first transformed image and the second transformed image.

7. The method of claim 1, which includes:
   (a) causing the processor to execute the instructions to perform comparison processing to a plurality of different positional relationships in the first transformed image and the second transformed image;
   (b) causing the processor to execute the instructions to generate a similarity as a correlation value based on a result of the comparison processing; and
   (c) causing the processor to execute the instructions to match the first image and the second image based on the generated similarity.

8. The method of claim 1, which includes:
   (a) causing the processor to execute the instructions to generate a correlation value based on a phase component which is a result of a rotation angle correction processing or an enlargement ratio correction processing and the Fourier transform processing to the first image and the second image; and
   (b) causing the processor to execute the instructions to perform the position correction processing to the first image and the second image based on the generated correlation value.

9. The method of claim 1, which includes:
   (a) causing the processor to execute the instructions to generate a plurality of the correlation values indicating a corrected position by a correlation processing to the first image and the second image;
   (b) causing the processor to execute the instructions to perform a plurality of the position correction processing to the first image and the second image based on the generated correlation values;
   (c) causing the processor to execute the instructions to perform image processing to the results of the plurality of the position correction processing of the first image and the second image in the position correction step to generate the first transformed image and the second transformed image;
   (d) causing the processor to execute the instructions to generate the correlation value based on the patterns in the first transformed image and the second transformed image; and
   (e) causing the processor to execute the instructions to match the first image and the second image based on the generated correlation value and the threshold set in advance.

10. The method of claim 9, which includes causing the processor to execute the instructions to match the first image and the second image to the result of the plurality of the position correction processing based on the total amount of the correlation value corresponding to different positions and the threshold set in advance.

11. An image matching apparatus comprising:
a processor;
a memory device storing instructions, which when executed by the processor, cause the processor to:
(a) perform a position correction processing to a first image and a second image, the first image including: (a) first points; and (b) first linear components, the second image including: (a) second points; and (b) second linear components;
(b) after performing the position correction processing, transform:
(i) the first points of the first image and the second points of the second image to a curved pattern; and
(ii) the first linear components of the first image and the second linear components of the second image to a plurality of overlapped curved-patterns, said transformation being based on a distance from a reference position to a shortest point in a straight line passing through a point in the image and an angle between a straight line passing though the reference position and the shortest point and a reference axis including the reference position, and
(c) generate a first transformed image and a second transformed image; and
(d) match the first image and the second image based on a degree of an overlap of the patterns in the first transformed image and the second transformed image and a matching or mismatching of the patterns in the first and second transformed images.

12. The image matching apparatus of claim 11, wherein when executed by the processor, the instructions cause the processor to:
(a) extract a region where the degree of the overlap of the curved patterns in the transformed image is equal to or greater than a threshold set in advance, from the first transformed image and the second transformed image; and
(b) match the first image and the second image based on the matching or mismatching of the patterns in the extracted regions from the first transformed image and the second transformed image respectively.

13. The image matching apparatus of claim 12, wherein when executed by the processor, the instructions cause the processor to determine the threshold based on a size of the extracted region so as to be larger than the set value.

14. The image matching apparatus of claim 12, wherein when executed by the processor, the instructions cause the processor to determine the threshold based on the size of the extracted region so as to be within the set value.

15. The image matching apparatus of claim 12, wherein when executed by the processor, the instructions cause the processor to delete the image when the size of the extracted region is equal to or less than the set value.

16. The image matching apparatus of claim 11, wherein when executed by the processor, the instructions cause the processor to perform a Hough transform processing to the first image and the second image to generate the first transformed image and the second transformed image.

17. The image matching apparatus of claim 11, wherein when executed by the processor, the instructions cause the processor to:
(a) perform a comparison processing to a plurality of different positional relationships in the first transformed image and the second transformed image;
(b) generate a similarity as a correlation value based on a result of the comparison processing; and
(c) perform the matching of the first image and the second image based on the generated similarity.

18. The image matching apparatus of claim 11, wherein when executed by the processor, the instructions cause the processor to:
(a) generate a correlation value based on a phase component which is a result of a rotation angle correction processing or an enlargement ratio correction processing and the Fourier transform processing to the first image and the second image; and
(b) perform the position correction processing to the first image and the second image based on the generated correlation value.

19. The image matching apparatus of claim 11, wherein when executed by the processor, the instructions cause the processor to:
(a) generate a plurality of the correlation values each indicating a corrected position by a correlation processing based on the first image and the second image;
(b) perform a plurality of the position correction processing to the first image and the second image based on the generated correlation value;
(c) perform image processing to the results of the plurality of the position correction processing of the first image and the second image to generate the first transformed image and the second transformed image;
(d) generate the correlation value based on the patterns in the first transformed image and the second transformed image and
(e) perform the matching of the first image and the second image based on the generated correlation value and the threshold set in advance.

20. The image matching apparatus of claim 19, wherein when executed by the processor, the instructions cause the processor to perform the matching of the first image and the second image to the result of the plurality of the position correction processing based on the total amount of the correlation value corresponding to different positions and the threshold set in advance.

21. A non-transitory computer readable medium storing a computer readable program structured to cause an apparatus to:
(a) perform a position correction processing to a first image and a second image, the first image including: (i) first points; and (ii) first linear components, the second image including: (i) second points; and (ii) second linear components;
(b) after performing the position correction processing, transform:
(i) the first points of the first image and the second points of the second image to a curved pattern; and
(ii) the first linear components of the first image and the second linear components of the second image to a plurality of overlapped curved-patterns, said transformation being based on a distance from a reference position to a shortest point in a straight line passing through a point in the image and an angle between a straight line passing though the reference position and the shortest point and a reference axis including the reference position;
(c) generate a first transformed image and a second transformed image; and
(d) match the first image and the second image based on a degree of an overlap of the patterns in the first transformed image and the second transformed image and a matching or mismatching of the patterns in the first and second transformed images.

22. The non-transitory computer readable medium of claim 21, wherein the instructions are further structured to cause the apparatus to:
(a) extract regions each of which indicates a degree of the overlap of the curved patterns in the transformed image equal to or greater than a threshold set in advance, from the first transformed image and the second transformed image;
(b) match the first image and the second image are carried out based on the matching or mismatching of the patterns in the regions extracted from the first transformed image and the second transformed image respectively.

23. The non-transitory computer readable medium of claim 22, wherein the instructions are further structured to cause the apparatus to determine the threshold based on a size of the extracted region such that the size of the extracted region is larger than the set value.

24. The non-transitory computer readable medium of claim 22, wherein the instructions are further structured to cause the apparatus to determine the threshold based on the size of the extracted region such that the size of the extracted region is within the set value.

25. The non-transitory computer readable medium of claim 22, wherein the instructions are further structured to cause the apparatus to delete the image when the size of the extracted region is equal to or less than the set value.

26. The non-transitory computer readable medium of claim 21, wherein the instructions are further structured to cause the apparatus to perform Hough transform processing to the first image and the second image to generate the first transformed image and the second transformed image.

27. The non-transitory computer readable medium of claim 21, wherein the instructions are further structured to cause the apparatus to:
(a) perform a comparison processing to a plurality of different positional relationships in the first transformed image and the second transformed image;
(b) generate a similarity as a correlation value based on a result of the comparison processing; and
(c) match the first image and the second image based on the generated similarity.

28. The non-transitory computer readable medium of claim 21, wherein the instructions are further structured to cause the apparatus to:
(a) generate a correlation value based on a phase component which is a result of a rotation angle correction processing or an enlargement ratio correction processing and the Fourier transform processing to the first image and the second image; and
(b) perform the position correction processing to the first image and the second image based on the generated correlation value.

29. The non-transitory computer readable medium of claim 21, wherein the instructions are further structured to cause the apparatus to:
(a) generate a plurality of the correlation values each indicating a corrected position by a correlation processing based on the first image and the second image;
(b) perform a plurality of the position correction processing to the first image and the second image based on the generated correlation value;
(c) perform image processing is performed to the results of the plurality of the position correction processing of the first image and the second image to generate the first transformed image and the second transformed image;
(d) generate the correlation value based on the patterns in the first transformed image and the second transformed image; and
(e) perform the matching of the first image and the second image based on the generated correlation value and the threshold set in advance.

30. The non-transitory computer readable medium of claim 29, wherein the instructions are further structured to cause the apparatus to perform the matching of the first image and the second image to the result of the ,plurality of the position correction processing based on the total amount of the correlation value corresponding to different positions and the threshold set in advance.

* * * * *